(12) United States Patent
Murata et al.

(10) Patent No.: US 9,417,486 B2
(45) Date of Patent: Aug. 16, 2016

(54) LIQUID CRYSTAL DISPLAY DEVICE

(71) Applicant: Sharp Kabushiki Kaisha, Osaka (JP)

(72) Inventors: Mitsuhiro Murata, Osaka (JP); Yosuke Iwata, Osaka (JP); Hidefumi Yoshida, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 154 days.

(21) Appl. No.: 14/403,069

(22) PCT Filed: May 22, 2013

(86) PCT No.: PCT/JP2013/064156
§ 371 (c)(1),
(2) Date: Nov. 21, 2014

(87) PCT Pub. No.: WO2013/176159
PCT Pub. Date: Nov. 28, 2013

(65) Prior Publication Data
US 2015/0153619 A1 Jun. 4, 2015

(30) Foreign Application Priority Data
May 23, 2012 (JP) ................................. 2012-117614

(51) Int. Cl.
G02F 1/1343 (2006.01)
G02F 1/1337 (2006.01)
G02F 1/139 (2006.01)
G02F 1/137 (2006.01)

(52) U.S. Cl.
CPC .......... *G02F 1/134309* (2013.01); *G02F 1/137* (2013.01); *G02F 1/1337* (2013.01);

(Continued)

(58) Field of Classification Search
CPC ............ G02F 1/134309; G02F 1/1337; G02F 1/134363; G02F 1/137; G02F 1/1395
See application file for complete search history.

(56) References Cited

U.S. PATENT DOCUMENTS

| 6,469,765 B1 * | 10/2002 | Matsuyama | ...... G02F 1/134363 349/141 |
| 2005/0024548 A1* | 2/2005 | Choi | ................. G02F 1/134363 349/43 |
| 2011/0279762 A1* | 11/2011 | Murata | ............. G02F 1/134363 349/138 |

FOREIGN PATENT DOCUMENTS

| JP | 2000-356786 A | 12/2000 |
| JP | 2002-23178 A | 1/2002 |

*Primary Examiner* — Anne Hines
(74) *Attorney, Agent, or Firm* — Chen Yoshimura LLP

(57) ABSTRACT

Provided is a liquid crystal display device having excellent display characteristics in a display mode that uses a vertical electric field and a horizontal electric field. This liquid crystal display device is provided with a first substrate and a second substrate provided facing each other and a liquid crystal layer sandwiched between the first and second substrates. The liquid crystal layer includes liquid crystal molecules having negative dielectric anisotropy. The first substrate is provided with a plate shaped first common electrode, an insulating film, and pixel electrodes, which are provided in a layer different from the first common electrode via the insulating film, and the pixel electrodes have a comb shaped structure. The second substrate is provided with a plate shaped second common electrode and a film formed by having an alignment treatment applied to a vertical alignment film that aligns the initial orientation of the liquid crystal molecules vertically. During the highest gradation, the difference in electric potential between the first common electrode and second common electrode is set to be larger than the difference in potential between the first common electrode and the pixel electrodes.

12 Claims, 24 Drawing Sheets

(52) U.S. Cl.
CPC ........ *G02F1/1395* (2013.01); *G02F 1/134363* (2013.01); *G02F 2001/13712* (2013.01); *G02F 2001/133742* (2013.01); *G02F 2001/133746* (2013.01); *G02F 2001/134372* (2013.01); *G02F 2001/134381* (2013.01)

FIG. 17  Pre-tilt 89.9°  Pixel Electrode 1.5V  L/S=3/24

Pre-tilt 75°
Pixel Electrode 3.0V  L/S=3/24

Pre-tilt 60°
Pixel Electrode 5.0V  L/S=3/24

LIQUID CRYSTAL DISPLAY DEVICE

TECHNICAL FIELD

The present invention relates to a liquid crystal display device. More specifically, the present invention relates to a liquid crystal display device that performs black display by applying a vertical electric field to liquid crystal having a negative dielectric anisotropy performs white display by applying a horizontal electric field thereto.

BACKGROUND ART

A liquid crystal display (LCD) panel is a device that blocks or allows light (controls on and off of display) through controlling the orientation of liquid crystal molecules having birefringence. The modes of liquid crystal orientation for LCDs include the TN (twisted nematic) mode in which liquid crystal molecules with a positive dielectric anisotropy are oriented such that the molecules are twisted 90° from a direction normal to the substrate, the vertical alignment (VA) mode in which liquid crystal molecules with a negative dielectric anisotropy are vertically oriented to the substrate surface, the in-plane switching (IPS) mode and fringe field switching (FFS) mode in which a horizontal electric field is applied to the liquid crystal layer by having the liquid crystal molecules being horizontally oriented to the substrate surface, and the like.

In VA mode, liquid crystal with a negative dielectric anisotropy is used, and display is performed by getting the liquid crystal molecules that are vertically oriented to the substrate surface to be horizontally oriented through a vertical electric field, but if a liquid crystal molecule is seen from a different angle, the perceived birefringence of the liquid crystal molecule changes, and thus causes a problem of having narrow viewing angles.

In IPS mode, display is performed by using a horizontal electric field that occurs between a pair of comb-shaped electrodes and taking advantage of the nature of liquid crystal molecules trying to become horizontally oriented to the electric field. In FFS mode, display is performed by using a horizontal electric field that occurs between a common electrode and pixel electrodes with an insulating layer therebetween and taking advantage of the nature of liquid crystal molecules trying to become horizontally oriented to the electric field. The viewing angles are improved in IPS mode and in FFS mode, but it is difficult to obtain a contrast ratio similar to VA mode.

Furthermore, recently, there has been new research in controlling the driving of the liquid crystal in display devices that conventionally perform display by using a horizontal electric field, such as IPS mode or FFS mode devices, by generating an additional vertical electric field (see Patent Documents 1 and 2, for example).

RELATED ART DOCUMENTS

Patent Documents

Patent Document 1: Japanese Patent Application Laid-Open Publication No. 2002-23178
Patent Document 2: Japanese Patent Application Laid-Open Publication No. 2000-356786

SUMMARY OF THE INVENTION

Problems to be Solved by the Invention

The present invention takes into consideration the above-mentioned situation, and an object thereof is to provide a liquid crystal display device having excellent display characteristics when using a display mode that uses a vertical electric field and a horizontal electric field.

Means for Solving the Problems

The inventors of the present invention have focused on a configuration of a liquid crystal display device having a liquid crystal layer with liquid crystal molecules that are initially vertically oriented and have a negative dielectric anisotropy, in which three types of electrodes are provided within a liquid crystal display device by providing a plate shaped first common electrode on one substrate and providing pixel electrodes on a different layer of the same substrate with an insulating layer therebetween, and providing a second common electrode on another substrate facing the substrate with a liquid crystal layer therebetween.

Black display is obtained by applying voltage between the pixel electrodes and the second common electrode and between the first common electrode and the second common electrode to generate a vertical electric field (electric field formed in the thickness direction of the liquid crystal layer) within the liquid crystal layer, and by horizontally orienting the liquid crystal molecules to the substrate surface. Furthermore, while the above mentioned voltage is being applied, it was found out that white display can be obtained by applying voltage such that the difference in potential between the first common electrode and the second common electrode is greater than the difference in potential between the first common electrode and the pixel electrodes, which forms a horizontal electric field (fringe field) within the liquid crystal layer while the liquid crystal molecules stay horizontally oriented to the substrate surface.

The inventors of the present invention have found that a liquid crystal display device with excellent display characteristics can be obtained by performing alignment treatment to at least the opposite substrate side and changing the pre-tilt properties of the vertical alignment film such that the occurring of orientation disorder (hereinafter, disclination) of the liquid crystal is suppressed.

According to this method, a liquid crystal display device with excellent display characteristics can be obtained with a different display method from VA mode and FFS mode.

A liquid crystal display device of the present invention includes: a first substrate and a second substrate facing each other; and a liquid crystal layer sandwiched between the first substrate and the second substrate, wherein the liquid crystal layer includes liquid crystal molecules having a negative dielectric anisotropy, wherein the first substrate has a first common electrode having a plate shape, an insulating film, and pixel electrodes provided on a different layer from the first common electrode, the insulating film being interposed between the pixel electrodes and the first common electrode, wherein the pixel electrodes have a comb-shaped structure, wherein the second substrate has a second common electrode having a plate shape, and a film formed by having an alignment treatment applied to a vertical alignment film to adjust an average initial inclination angle of the liquid crystal molecules at the vertical alignment film, and wherein the liquid crystal display device is configured such that when gradation is highest, a difference in potential between the first common electrode and the second common electrode is greater than a difference in potential between the first common electrode and the pixel electrodes.

As for the configuration of the liquid crystal display device of the present invention, as long as these type of components are necessary, other components that are usually used in liquid crystal display devices can be used as appropriate. Furthermore, the alignment treatment above may be performed to the first substrate as well, or in other words, the first substrate may have a film formed by having an alignment treatment applied to a vertical alignment film to adjust an average initial inclination angle of the liquid crystal molecules at the vertical alignment film.

The liquid crystal layer above includes liquid crystal molecules having a negative dielectric anisotropy. The liquid crystal molecules have characteristics in which the liquid crystal molecules tilt in a direction perpendicular to the direction of the electric field when voltage is applied thereto.

The pixel electrodes above having comb shaped structures are provided in a different layer from that of the first common electrode via an insulating film. By having this type of structure, a fringe field can be formed between the pixel electrodes and the first common electrode. The comb shaped structure above is namely a structure in which a plurality of slits are formed in the pixel electrode. Specific examples of the comb shaped structure are (i) one end of the slit is open and the other end is closed, and (ii) both ends of the slit are closed.

The first common electrode and the second common electrode are respectively supplied with common potentials having different sizes. As a result, a vertical electric field is formed as a difference in potential occurs between the second common electrode and the first common electrode and between the second common electrode and the pixel electrodes.

The second substrate is provided with a film that has undergone alignment treatment on the vertical alignment film that makes the initial orientation of the liquid crystal vertical. The alignment film material may be either an organic material, an inorganic material, or an optically active material. The alignment treatment can be performed by rubbing treatment, photoalignment treatment, or the like, and defines the direction of the liquid crystal molecules. "The direction of the liquid crystal molecules" is the long axes direction of the liquid crystal molecules when the substrate is seen from a plan view. The "alignment treatment" here means something that changes the pre-tilt properties of the vertical alignment film, and makes the average initial inclination angle of the liquid crystal molecules to the second substrate at least smaller than 90°. The "inclination angle" represents a range in which the angle of the long axes of the liquid crystal molecules is 0° to 90° with respect to the substrate surface, and "average inclination angle" or "pre-tilt angle" is the average of the inclination angles of the liquid crystal molecules with respect to the respective substrates when no voltage is being applied. As a result, the liquid crystal molecules are suppressed from flipping, and disclination can be suppressed from occurring.

The liquid crystal display device is set such that when the gradation is highest, the difference in potential between the first common electrode and the second common electrode is greater than the difference in potential between the first common electrode and the pixel electrodes. As a result, white display can take place while horizontally orienting the liquid crystal molecules to the substrate surface. The highest gradation refers to the state in which the brightness during display is highest (white display).

As for the pre-tilt angle, specifically, it is preferable that the average initial inclination angle of the liquid crystal molecules at the second substrate be less than or equal to 70°. Furthermore, from the same perspective, it is preferable that the average initial inclination angle of the liquid crystal molecules at the first substrate be less than or equal to 70°. The relationship between the occurring of disclination and the size of the pre-tilt angle will be described in detail in the evaluation tests discussed later.

From a different perspective, it is preferable that the average initial inclination angle of the liquid crystal molecules at the second substrate be less than or equal to 40°. Furthermore, it is preferable that the average initial inclination angle of the liquid crystal molecules at the first substrate be less than or equal to 40°. If the average initial inclination angle is less than or equal to 40°, smoother and better VT characteristics can be obtained. The evaluation tests described later will also discuss this point.

It is preferable that the difference in potential between the first common electrode and the pixel electrodes of the liquid crystal display device be set from 0.1 to 1.0V when the gradation is lowest. In this manner, display with a high contrast ratio can be performed with the display method of the present invention, because the equipotential surface becomes more horizontal to the substrate surface and excellent black display can be obtained. The lowest gradation refers to the state in which the brightness during display is lowest (black display).

The first and the second substrate provided in the liquid crystal display device of the present invention are a pair of substrates that sandwich the liquid crystal layer and are insulating substrate made of glass or resin as the main component thereof, and have wiring lines, electrodes, color filters, or the like on the respective insulating substrates. Furthermore, it is preferable that an overcoat layer (permittivity ∈r=3 to 4) that planarizes uneven surfaces be provided on the color filter to maintain the vertical electric field.

It is preferable that the first substrate be an active matrix substrate having an active element.

In a general VA mode, usually the pre-tilt angle is not made smaller due to contrast ratio decreasing. On the other hand, in the present invention, black display is performed while the liquid crystal molecules are horizontally oriented, and thus the contrast ratio does not decrease even if the pre-tilt angle is made smaller.

Furthermore, the present invention differs from a general FFS mode in that the present invention has liquid crystal having a negative dielectric anisotropy and a vertical alignment film.

Effects of the Invention

According to the present invention, a liquid crystal display device that uses a display method using vertical and horizontal electric fields and that has excellent display characteristics can be obtained.

DETAILED DESCRIPTION OF EMBODIMENTS

Embodiments are shown below and the present invention is described in further detail with reference to the drawings, but the present invention is not limited to these embodiments.

Embodiment 1

Figure 1:
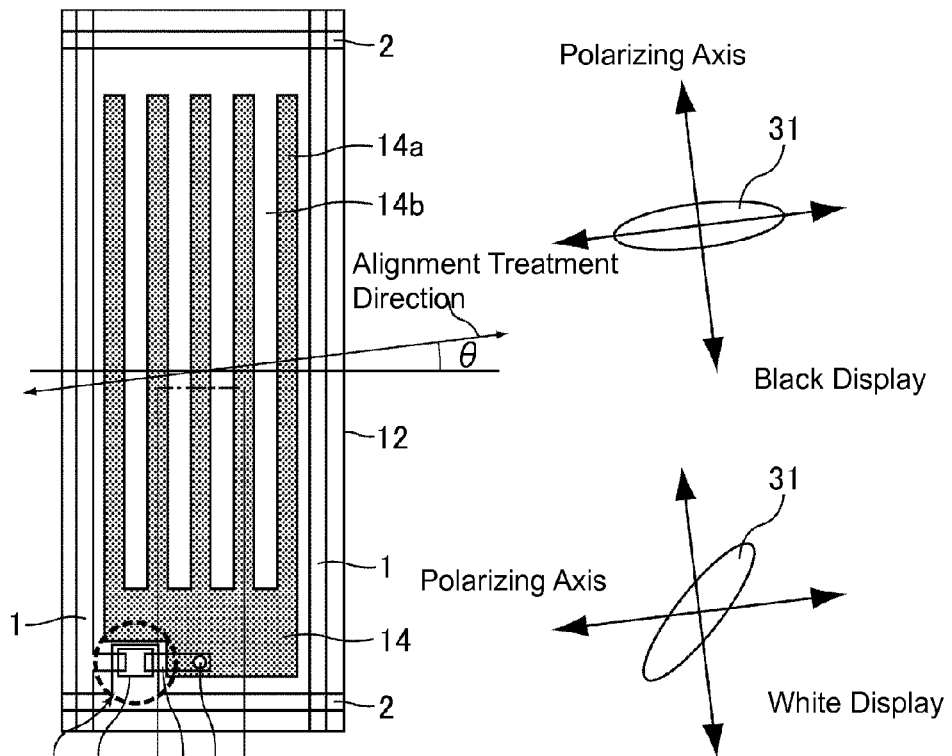
FIG. 1 is a schematic plan view of one pixel in a liquid crystal display device of Embodiment 1.
Figure 2:
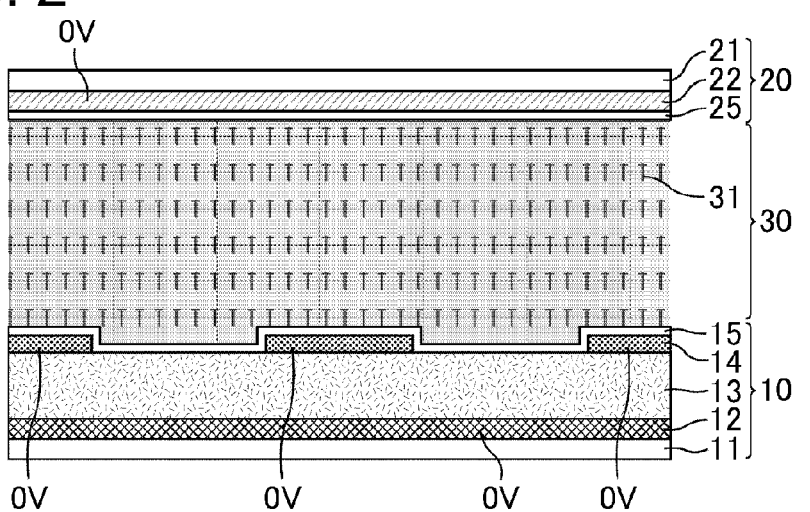
FIG. 2 is a schematic cross-sectional view along the line A-B of the liquid crystal display device in FIG. 1 when a voltage is not applied.

FIG. 1 is a schematic plan view of one pixel in the liquid crystal display device of Embodiment 1, and FIG. 2 is a schematic cross-sectional view of the liquid crystal display device along the line A-B in FIG. 1 when a voltage is not applied. The liquid crystal display device of Embodiment 1 has a first substrate 10, a second substrate 10, and a liquid crystal layer 30 sandwiched by the first substrate 10 and the second substrate 20. The liquid crystal layer 30 has liquid crystal molecules 31 having a negative dielectric anisotropy. The first substrate 10 is provided with a supporting substrate 11, a thin film transistor (TFT) 6, a scan signal line 2, a data signal line 1, a first common electrode 12, pixel electrodes 14, an insulating film 13 that electrically separates a first common electrode 12 from the pixel electrodes 14, and an alignment film 15. The second substrate 20 is provided with a supporting substrate 21, a second common electrode 22, a color filter, a black matrix, and an alignment film 25.

The pixel electrodes 14 are respectively provided in areas surrounded by the scan signal lines 2 and the data signal lines 1. The TFTs 6 are formed of respective portions of the data signal lines 1, the scan signal lines 2, drain lead-out wiring 4, and a semiconductor layer 3. The TFTs 6 functions as switching elements. The pixel electrodes 14 are connected to the drain lead-out wiring 4 that extends from the TFTs 6 through a contact hole 5. If the TFTs 6 are turned on by a scan signal supplied by the scan signal lines 2, the semiconductor layer 3 becomes conductive and a data signal supplied through the data signal lines 1 is written into the pixel electrodes 14.

In Embodiment 1, the pixel electrodes 14 have a comb shaped structure in which one end of a slit 14b is open. It is preferable that the width of a comb shaped portion 14a be 2 μm to 7 μm. Furthermore, it is preferable that the gap (slit) between the adjacent comb shaped portions 14b be 2 μm to 7 μm. If the width of the slit is less than 2 μm, then there is a risk that the actual transmissive portion becomes small, and if the slit is wider than 7 μm, then there is a risk that the fringe field becomes weak, and the switching of liquid crystal molecules becomes slower.

Comb shaped electrodes facing the pixel electrodes 14 are not provided, and a horizontal electric field (fringe field) can be formed solely by the pixel electrodes 14 and the first common electrode 12.

The first common electrode 12 is formed in a plate shape on the first substrate, the pixel electrodes 14 being formed thereon with the insulating film 13 therebetween. The insulating film 13 is an organic film including an acrylic photosensitive resin (permittivity $\varepsilon r=3$ to 4), an inorganic film (permittivity $\varepsilon r=5$ to 7) including silicon nitride or the like. The first common electrode 12 is supplied with a common potential of 0V, for example.

The second common electrode 22 is connected to an alternating current power supply, and taking symmetry into consideration, common potentials of −5V to −10V and +5V to +10V are supplied in an alternating fashion. As for the second common electrode 22, it is preferable that the common potential be supplied thereto such that the difference in potential between the second common electrode 22 and the first common electrode 12 is greater than the difference in potential between the first common electrode 12 and the pixel electrodes 14.

The alignment films 15 and 25 are films given alignment treatment on the vertical alignment film. Alignment treatment can be performed by rubbing treatment, photoalignment treatment, or the like, and is performed such that the orientation direction has an angle θ that is 3 to 10° to the axis perpendicular to the lengthwise direction of the comb shaped portion. The rotating direction of the liquid crystal molecules can be matched by the alignment direction being at an angle to the axis perpendicular to the lengthwise direction of the comb shaped portion, or in other words, by being at an angle to the direction in which a horizontal electric field occurs.

The pre-tilt angle is not limited as long as it is smaller than 90°, preferably, 70° or less, and even more preferably, 40° or less. As mentioned later, if the pre-tilt angle is 70° or less, then the disclination is effectively suppressed, and if the angle is 40° or less, then excellent VT characteristics can be obtained. The size of the pre-tilt angle can be controlled by changing the structure of the side chains and the main chains of the compounds used in a vertical alignment film, and by adjusting the rubbing strength for rubbing treatment, or by adjusting the intensity of the light radiated for photoalignment treatment.

In Embodiment 1, the orientation direction can be suitably defined by performing antiparallel treatment on the first substrate and the second substrate. If an alignment treatment is performed in a direction of 7° to the first substrate, then an alignment treatment is performed in a direction of 187° on the second substrate, for example. Polarizing plates are respectively bonded to the first substrate and the second substrate on the surfaces thereof that face the side opposite to the liquid crystal layer. Both polarizing plates are disposed so as to be perpendicular to the polarizing axis, and are disposed such that a polarizing axis of one substrate matches the alignment treatment direction.

Below, principles behind the driving of a liquid crystal display device of Embodiment 1 of the present invention will be explained.

First, a case in which voltage is not applied is described in FIG. 2. "A case in which voltage is not applied" refers to a case in which voltage is not applied to any of the first common electrode 12, the second common electrode 22, and the pixel electrodes 14. The liquid crystal molecules 31 have a prescribed pre-tilt angle with respect to the respective surfaces of the first and second substrates 10 and 20. In FIG. 2, an example is shown in which the alignment films 15 and 25 have alignment treatment performed thereto such that the pre-tilt angle is 89.9° to the first substrate 10 and the second substrate 20.

Figure 3:
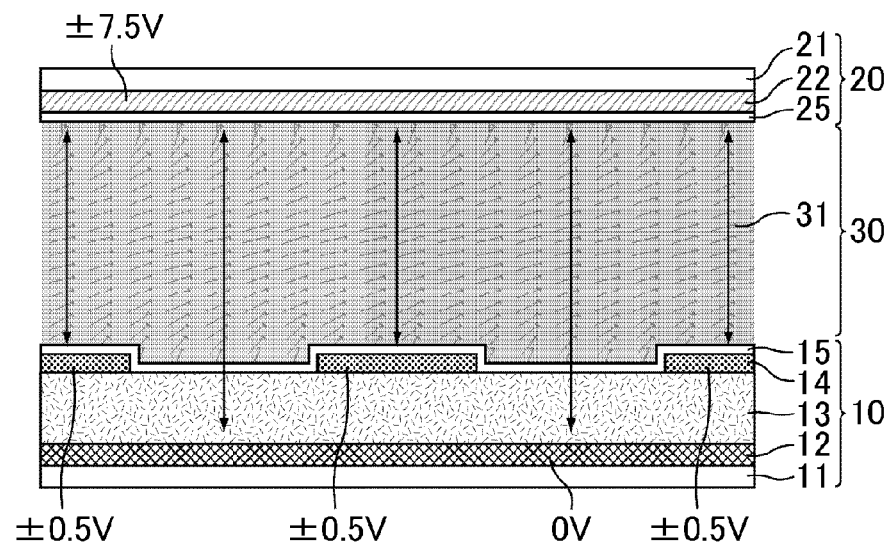
FIG. 3 is a schematic cross-sectional view of the liquid crystal display device of Embodiment 1 when a vertical electric field is occurring.

Next, a description will be provided for a case regarding black display. FIG. 3 is a schematic cross-sectional view of the liquid crystal display device of Embodiment 1 when a vertical electric field is occurring. In FIG. 3, the arrow indicates the direction of the electric field. During black display, a voltage is applied between the second common electrode 22 and the first common electrode 12, and between the second common electrode 22 and the pixel electrodes 14 such that a vertical electric field that is substantially perpendicular to the substrate surface occurs in the liquid crystal layer. In FIG. 3, an example is shown in which 0V is supplied to the first common electrode 12, ±0.5V to the pixel electrodes 14, and ±7.5V to the second common electrode 22. As the liquid crystal molecules 31 have a negative dielectric anisotropy, the liquid crystal molecules 31 are oriented in a direction perpendicular to the vertical electric field, and thus are oriented so as to be horizontal to the first and second substrates 10 and 20. When this is seen in a plan view, as shown in FIG. 1, the liquid crystal molecules 31 are inclined towards a direction in which alignment treatment is performed. Black display takes place by blocking the light from the backlight by having one of the polarizing axes of the polarizing plates of the first substrate 10 and the second substrate 20 match the alignment treatment direction, and by disposing the respective polarizing plates such that the polarizing axes of the polarizing plates become perpendicular to each other.

Furthermore, an excellent black display can be obtained by having the difference in potential between the first common electrode 12 and the pixel electrodes 14 be 0.1 to 1.0V such that the equipotential surface between the electrodes is more parallel to the substrate surface. The evaluation tests described later will discuss this point.

Figure 4:
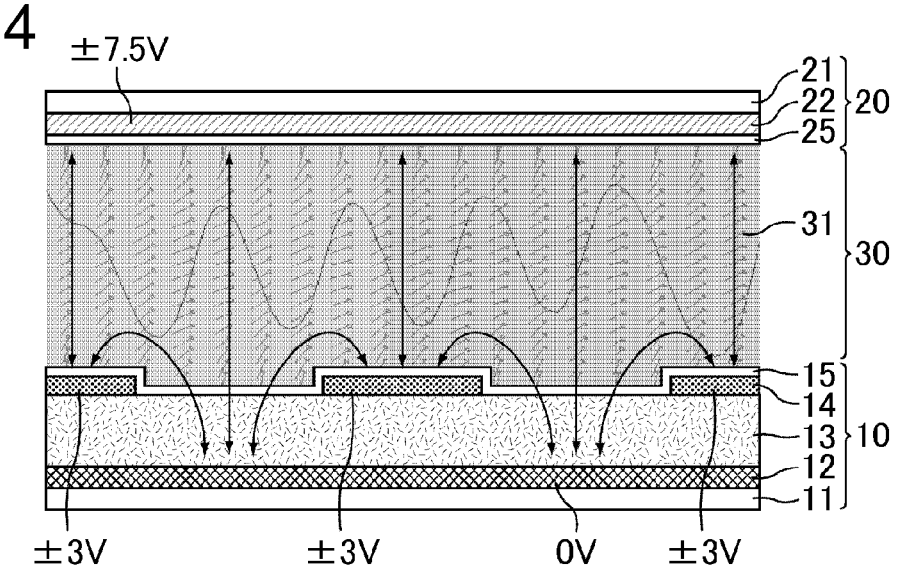
FIG. 4 is a schematic cross-sectional view of the liquid crystal display device of Embodiment 1 when a horizontal electric field is occurring.

Next, a description will be provided for a case regarding white display. FIG. 4 is a schematic cross-sectional view of the liquid crystal display device of Embodiment 1 when a horizontal electric field is occurring. In FIG. 4, the arrow shows the direction of the electric field that occurs, and the solid line inside the liquid crystal layer 30 shows the transmittance. During white display, a horizontal electric field can occur in addition to a vertical electric field by applying a voltage between the pixel electrodes 14 and the first common electrode 12 while voltage is applied between the second common electrode 22 and the first common electrode 12, and between the second common electrode 22 and the pixel electrodes 14. A voltage that is at least a threshold for horizontally rotating the liquid crystal molecules 31 is supplied to the pixel electrodes 14 in accordance with the timing of TFT switching. In FIG. 4, an example is shown in which 0V is supplied to the first common electrode 12, ±3V to the pixel electrodes 14, and ±7.5V to the second common electrode 22. The liquid crystal molecules 31 rotate horizontally in respect to the substrate surface as a result of the liquid crystal molecules 31 attempting to be oriented perpendicularly to the horizontal electric field. As shown in FIG. 1, if this is seen in a plan view, the liquid crystal molecules 31 are at an angle with respect to the polarizing axis of the polarizing plate, and therefore this allows light from the backlight to pass through, leading to white display.

As mentioned above, by forming a horizontal electric field while forming a vertical electric field, the display mode of the liquid crystal display device can be switched.

Below, the manufacturing method and materials of each member is described.

As for materials of the supporting substrates 11 and 21, transparent materials such as glass and plastic can be suitably used. As long as the alignment films 15 and 25 make the liquid crystal molecules perpendicular to the film surface thereof before alignment treatment is performed, the alignment films may be an organic alignment film or an inorganic alignment film.

The first common electrode 12, the second common electrode 22, and the pixel electrodes 14 can be formed by first forming a single layer or multiple layers of a transparent conductive material such as indium tin oxide (ITO), indium zinc oxide (IZO), zinc oxide (ZnO), tin oxide (SnO), or a compound of these, through sputtering or the like, and then performing patterning through photolithography or the like. The slits 14b of the pixel electrodes 14 can also be formed simultaneously during patterning.

The first substrate 10 and the second substrate 20 that are manufactured in this manner are bonded to each other with a sealing member after a plurality of columnar spacers formed of insulating material are provided on one of the substrates. The liquid crystal layer 30 is formed between the first substrate 10 and the second substrate 20. If the drip method is applied, the dripping of the liquid crystal material is performed before the substrates are bonded, and if the vacuum injection method is applied, the liquid crystal material is injected after the substrates are bonded. Then, the liquid crystal display device is completed by bonding a polarizing plate, a phase contrast film, and the like onto each substrate on the side thereof opposite to the liquid crystal layer 30 side. Furthermore, a liquid crystal display device for different usages is formed by mounting a gate driver, a source driver, a display control circuit, and the like, and adding a backlight and the like.

The structure of the liquid crystal display device of Embodiment 1 can be confirmed and measured using a scanning electron microscope (SEM), for example.

The dielectric anisotropy of the liquid crystal molecules 31 can be confirmed by analyzing the molecular structure of the liquid crystal material through gas chromatography, for example.

The average initial inclination angle of the liquid crystal molecules 31 with respect to a substrate can be measured for each substrate using the pre-tilt angle measuring device manufactured by Shintech.

Whether or not an alignment treatment was performed on a vertical alignment film can be confirmed by radiating diffuse ultraviolet light onto a surface of the substrate. After the diffuse ultraviolet light is radiated, if the liquid crystal molecules are vertically oriented, then it can be seen that the orientation of the liquid crystal molecules before the alignment treatment was vertical.

Embodiment 2

Figure 5:
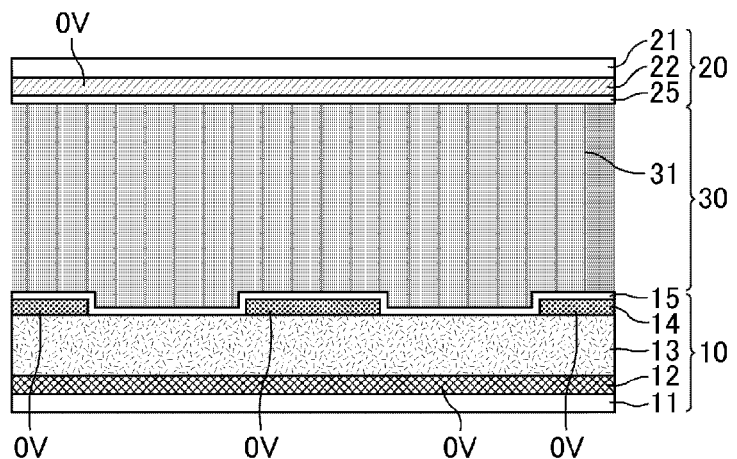
FIG. 5 is a schematic cross-sectional view of a liquid crystal display device of Embodiment 2.

Embodiment 2 is similar to Embodiment 1 except that alignment treatment is performed only on a second substrate, and alignment treatment is performed on a vertical alignment film that makes the initial orientation of the liquid crystal vertical. FIG. 5 is a schematic cross-sectional view of a liquid crystal display device of Embodiment 2. An alignment film 15 provided on a first substrate 10 does not have a feature of applying a prescribed pre-tilt angle to liquid crystal molecules 31. On the other hand, alignment treatment is performed on an alignment film 25 provided on a second substrate 20 and the alignment film 25 has a function of applying a prescribed pre-tilt angle to the liquid crystal molecules 31. A vicinity of the second substrate 20 has a weaker electric field than a vicinity of the first substrate 10, and thus disclination occurs more easily therein, but by making the pre-tilt angle to the liquid crystal molecules 31 in at least a vicinity of the second substrate 20 small, the occurrence of disclination can be effectively suppressed.

Embodiment 3

Figure 6:
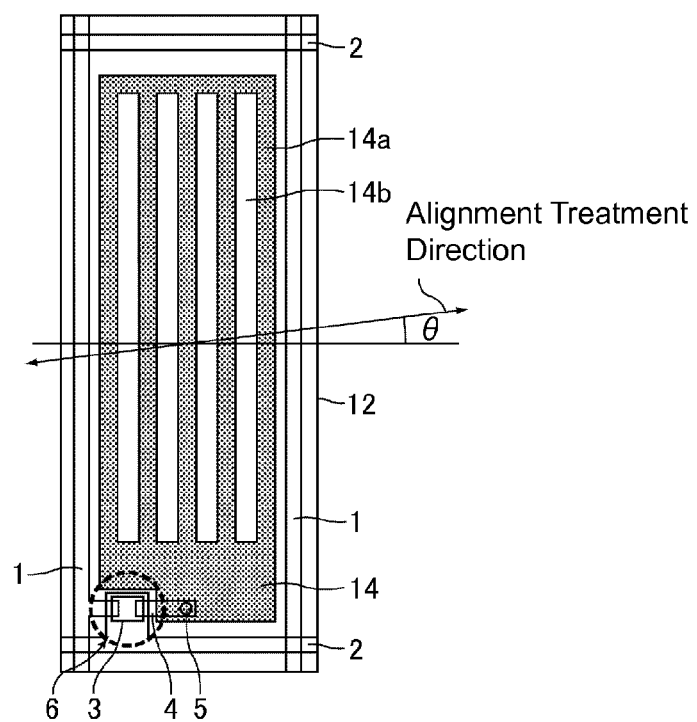
FIG. 6 is a schematic plan view of one pixel in a liquid crystal display device of Embodiment 3.

Embodiment 3 is the same as Embodiment 1, except that both ends of a slit of a pixel electrode having a comb shape are closed. FIG. 6 is a schematic plan view of a pixel of a liquid crystal display device of Embodiment 3. It is preferable that a width of each comb shaped portion 14a of respective pixel electrodes 14 is 2 μm to 7 μm. Furthermore, it is preferable that the gap (slit) 14b between the adjacent comb shaped portions be 2 μm to 7 μm. If the width of the slit is less than 2 μm, then there is a risk that the actual transmissive portion becomes small, and if the slit is wider than 7 μm, then there is a risk that the fringe field becomes weak, and the switching of liquid crystal molecules becomes slower. Embodiment 3 can obtain a similar effect to that of Embodiment 1.

Embodiment 4

Figure 7:
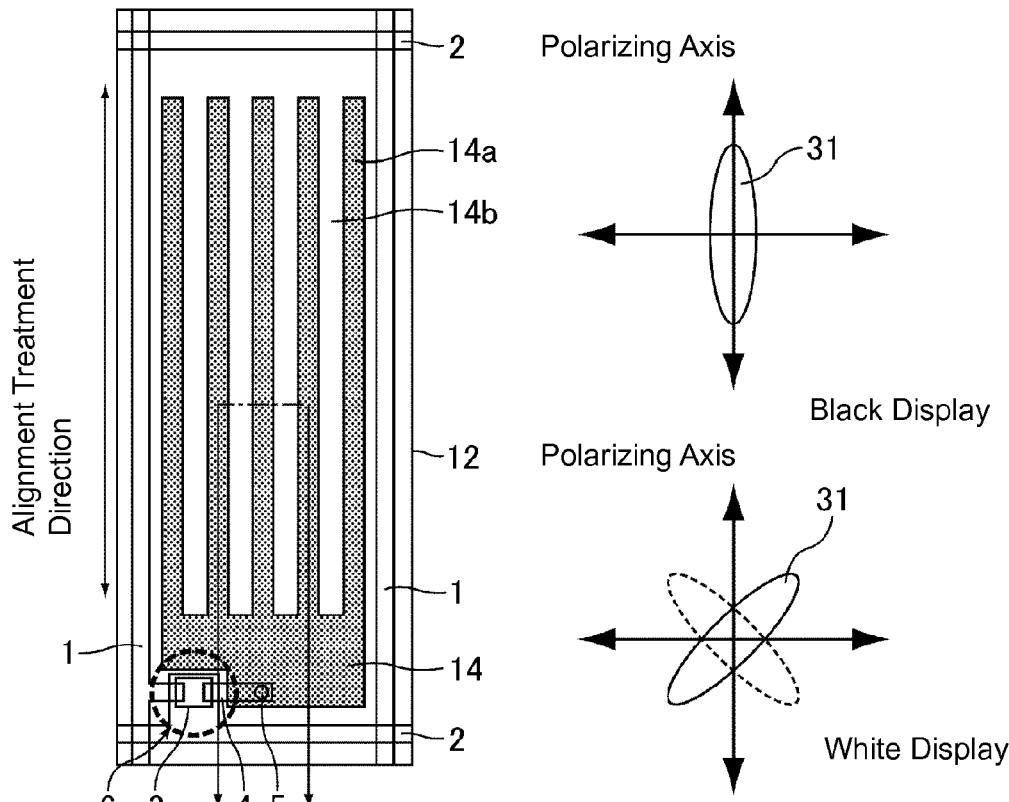
FIG. 7 is a schematic plan view of one pixel in a liquid crystal display device of Embodiment 4.
Figure 8:
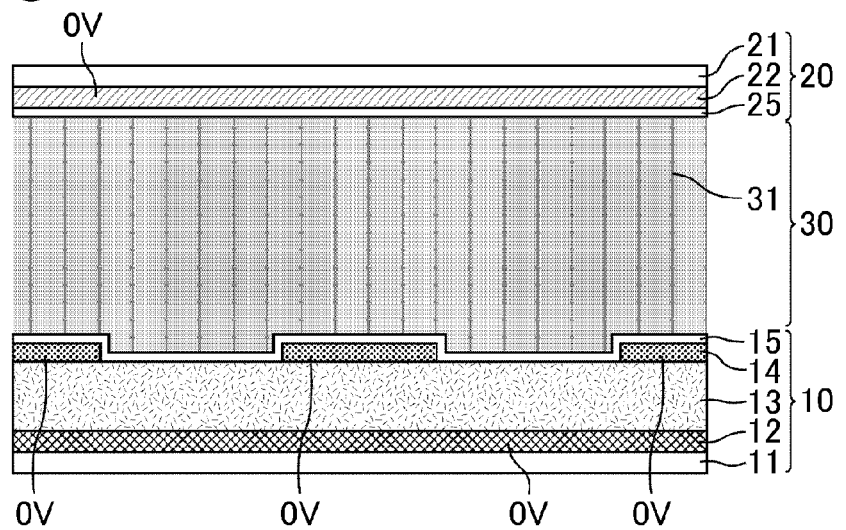
FIG. 8 is a schematic plan view along the line C-D of the liquid crystal display device in FIG. 7 when a voltage is not applied.
Figure 9:
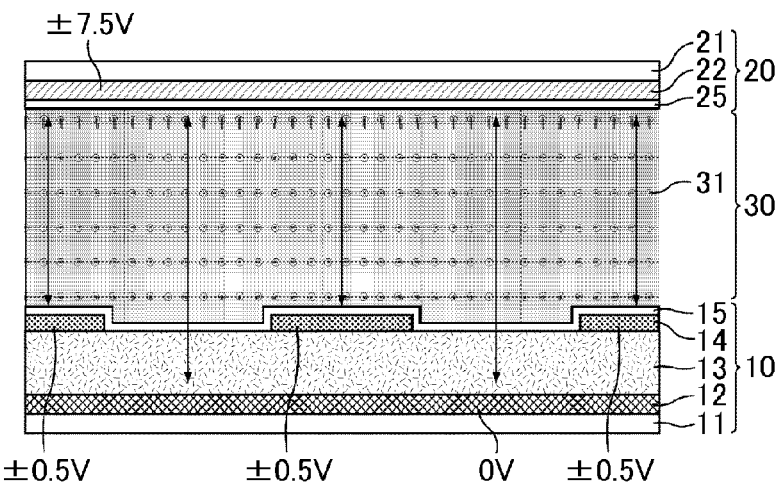
FIG. 9 is a schematic cross-sectional view of the liquid crystal display device of Embodiment 4 when a vertical electric field is occurring.
Figure 10:
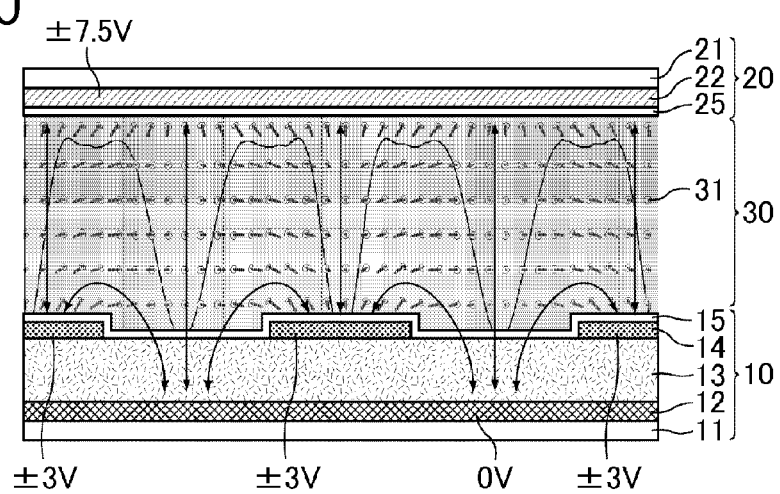
FIG. 10 is a schematic cross-sectional view of the liquid crystal display device of Embodiment 4 when a horizontal electric field is occurring.
Figure 11:
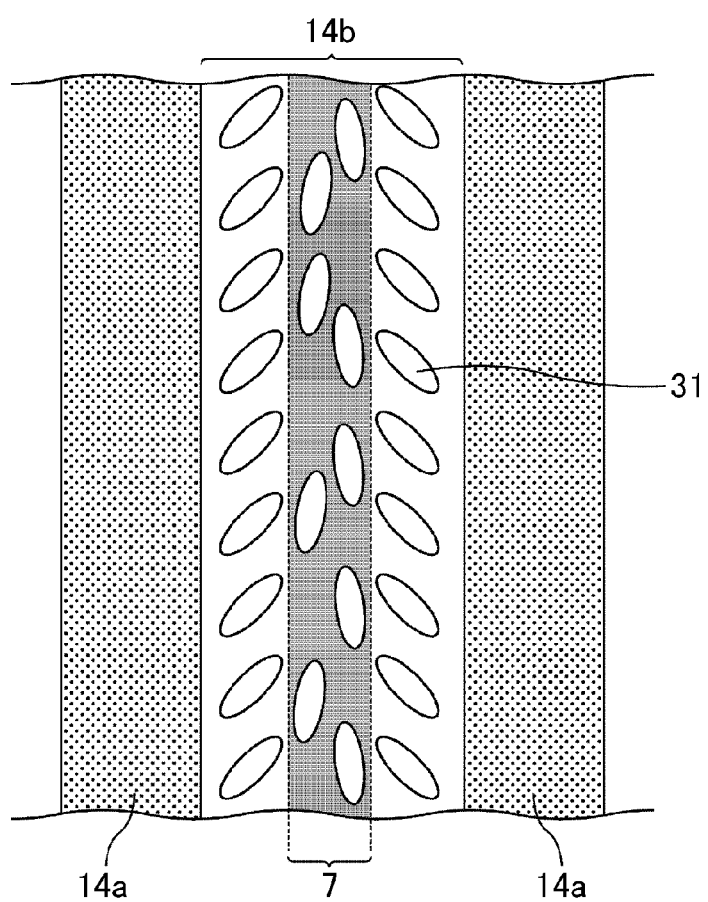
FIG. 11 is a schematic plan view in which the area between electrodes where a horizontal electric field of the liquid crystal display device of Embodiment 4 is occurring has been magnified.

Embodiment 4 is the same as Embodiment 1 except that alignment treatment is performed such that the liquid crystal molecules are oriented so as to be parallel to the lengthwise direction of the comb shaped portion in pixel electrodes when performing black display. FIG. 7 is a schematic plan view of one pixel in the liquid crystal display device of Embodiment 4, and FIG. 8 is a schematic cross-sectional view of the liquid crystal display device along the line C-D in FIG. 7 when a voltage is not applied. FIG. 9 is a schematic cross-sectional view of the liquid crystal display device of Embodiment 4 when a vertical electric field is occurring, and FIG. 10 is a schematic cross-sectional view of the liquid crystal display device of Embodiment 4 when a horizontal electric field is occurring. FIG. 11 is a magnified schematic cross-sectional view of an area between the electrodes of the liquid crystal display device of Embodiment 4 when a horizontal electric field is occurring. In FIGS. 9 and 10, the arrow shows a direction of the electric field, and in FIG. 10, the solid line in a liquid crystal layer 30 shows the transmittance.

As shown in FIG. 8, when a voltage is not applied, the liquid crystal molecules 31 are oriented perpendicular to the substrate surface. As shown in FIG. 9, during black display, the liquid crystal molecules 31 are horizontally oriented to first and second substrates 10 and 20, and if this is seen in a plan view as shown in FIG. 7, the liquid crystal molecules 31 are oriented parallel to the lengthwise direction of the comb shaped portion of the pixel electrodes. During white display, as shown in FIG. 10, the liquid crystal molecules 31 rotate horizontally with respect to the substrate surface, and when this is seen in a plan view as shown in FIG. 7, the liquid crystal molecules 31 rotate such that the angle thereof is 45° or 135° to the lengthwise direction of the comb shaped portion of the pixel electrodes. Furthermore, it can be seen that dark lines appear in an area near the center of a gap between adjacent comb shaped portions and on the comb shaped portions due to the transmittance curve thereof dropping. If this is magnified, as shown in FIG. 11, the liquid crystal molecules 31 rotate so as to incline towards a center of the slit 14b from two adjacent comb shaped portions 14a, and in a vicinity of the area near the gap between the adjacent comb shaped portions, dark lines 7 can be seen along the lengthwise direction of the comb shaped portion 14a.

In Embodiment 4, dark lines were seen as mentioned above, but as a whole, a liquid crystal display device with excellent display can be obtained.

Evaluation Test 1

In Evaluation Test 1, a study of simulation for slits with different widths was conducted concerning disclination that occurs during white display. The plan view image and the cross-sectional view image were created using an orientation simulator "LCD Master" manufactured by Shintech. A simulation took place with the following conditions: the pre-tilt angle of the liquid crystal molecules is 89.9° with respect to the first substrate and the second substrate; and the alignment treatment direction is 7° with respect to the axis perpendicular to the lengthwise direction of the comb shaped portion. It is presumed that a polarizing plate is bonded to the first substrate and the second substrate such that the polarizing axis is in a crossed Nicols state, and that the alignment treatment direction and the polarizing axis of the polarizing plate on one of the substrates match. Below, in the evaluation tests, the width of an electrode of the comb shaped portion of the pixel electrode is L, and the width of the slit is S, and if the width of the electrode is 3 μm and the width of the slit is 3 μm, then L/S=3/3.

Figure 12:
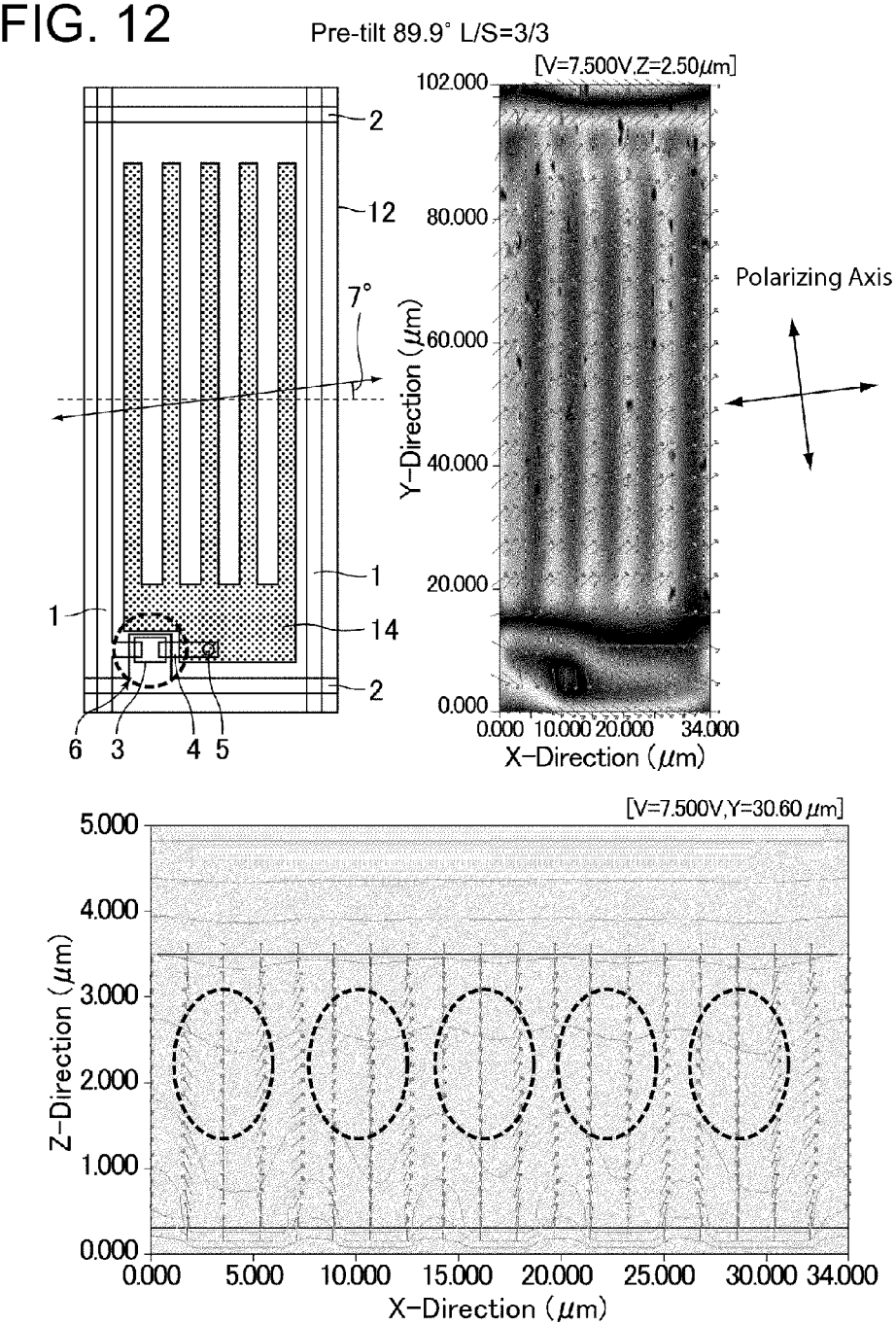
FIG. 12 is a schematic plan view, a plan view image, and a cross-sectional image of the liquid crystal cell when L/S=3/3 in an Evaluation Test 1.
Figure 13:
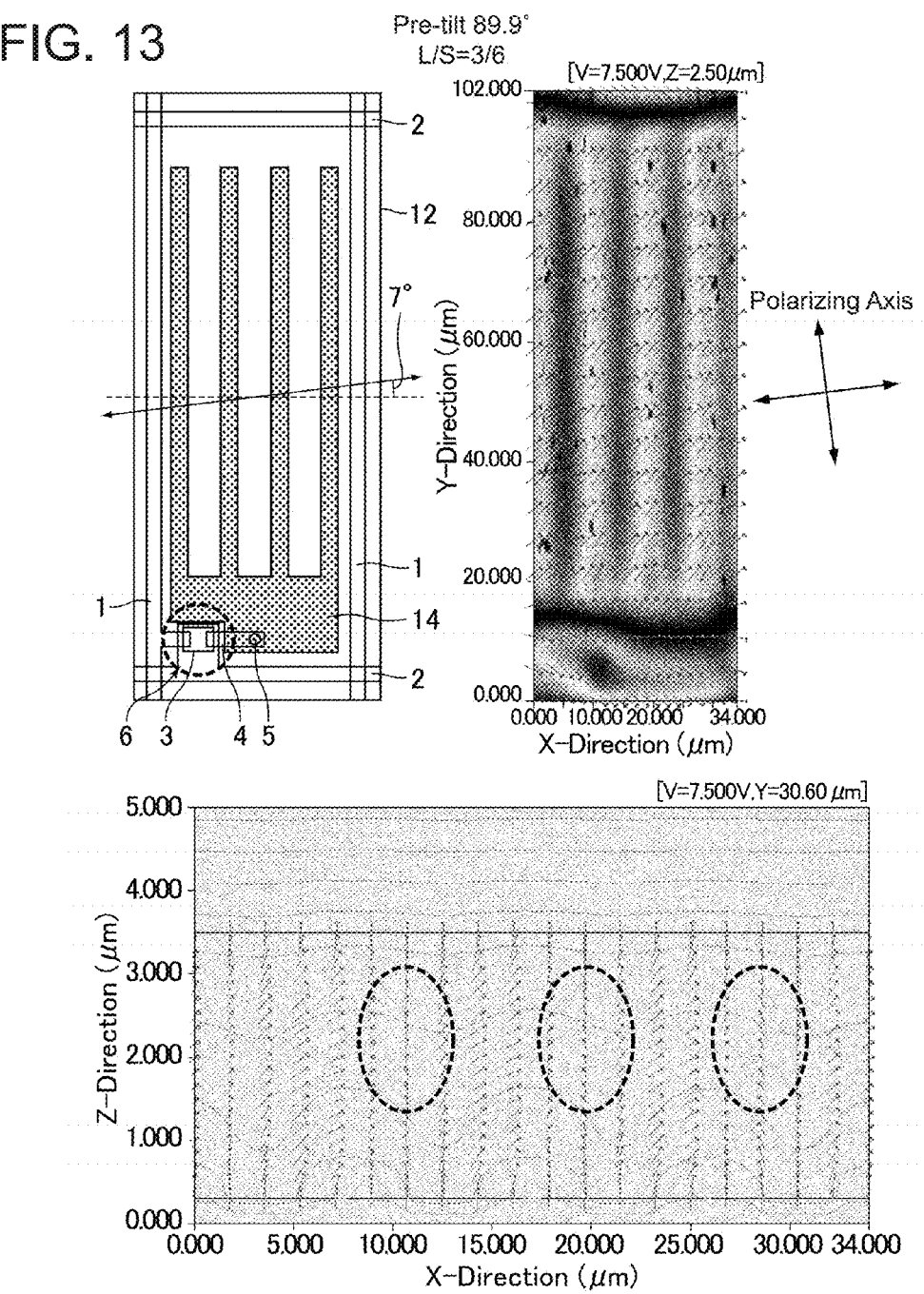
FIG. 13 is a schematic plan view, a plan view image, and a cross-sectional image of the liquid crystal cell when L/S=3/6 in the Evaluation Test 1.
Figure 14:
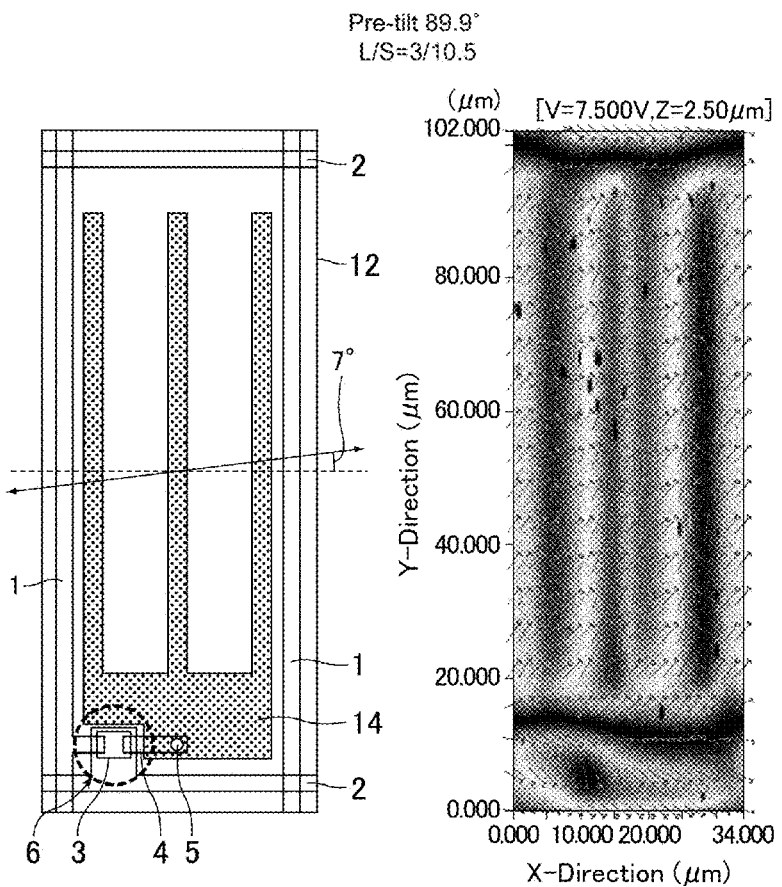
FIG. 14 is a schematic plan view and a plan view image of the liquid crystal cell when L/S=3/10.5 in the Evaluation Test 1.
Figure 15:
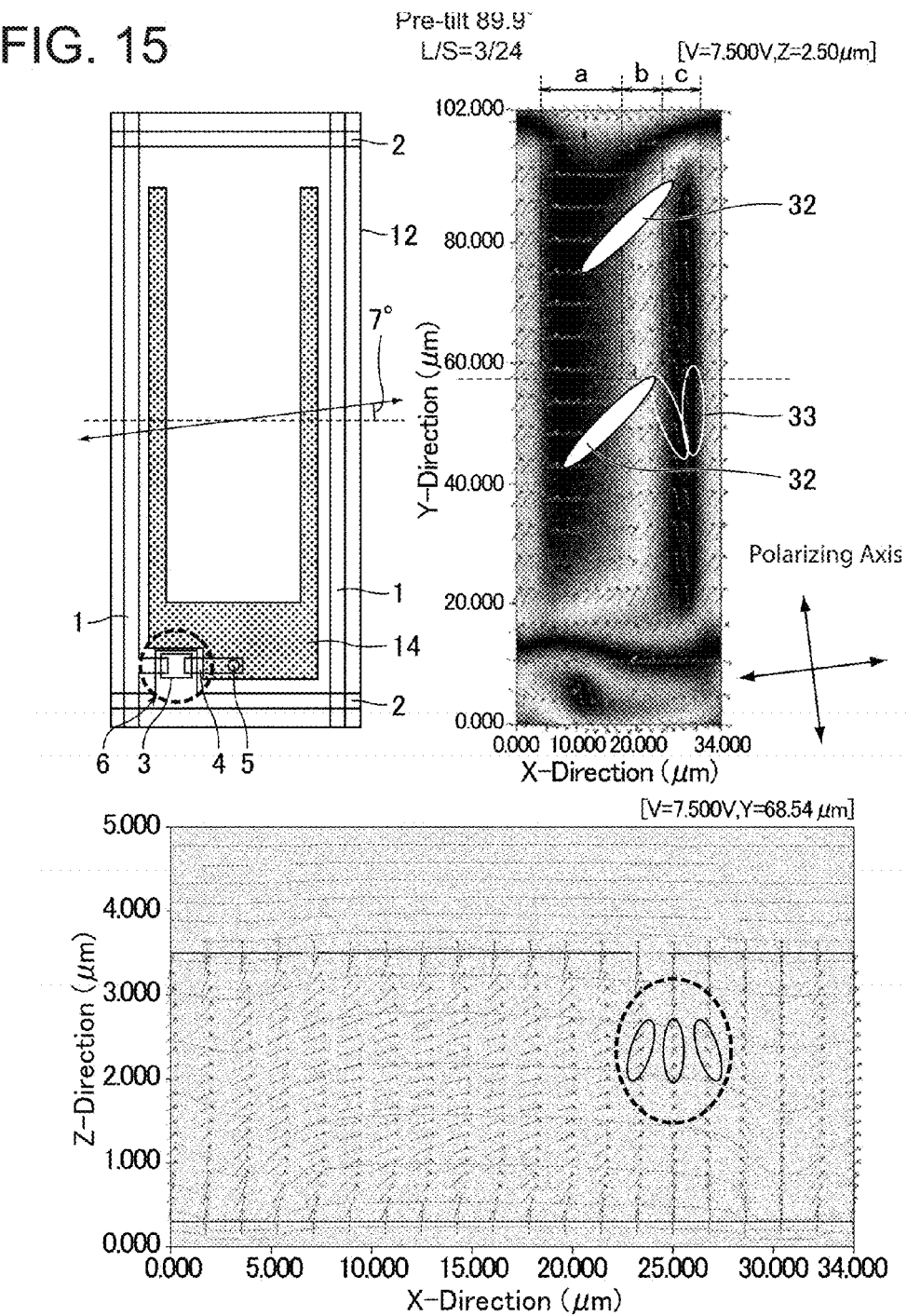
FIG. 15 is a schematic plan view, a plan view image, and a cross-sectional image of the liquid crystal cell when L/S=3/24 in the Evaluation Test 1.

FIG. 12 is a schematic plan view, a plan view image, and a cross-sectional image of a liquid crystal cell if L/S=3/3, FIG. 13 is a schematic plan view, a plan view image, and a cross-sectional image of a liquid crystal cell if L/S=3/6, FIG. 14 is a schematic plan view, a plan view image, and a cross-sectional image of a liquid crystal cell if L/S=3/10.5, and FIG. 15 is a schematic plan view, a plan view image, and a cross-sectional image of a liquid crystal cell if L/S=3/24 The solid line of each cross-sectional image shows an equipotential line.

As shown in the plan view images in FIGS. 12 to 15, for any width of the slits, disclination was seen along the outer edge of the comb shaped portions of the pixel electrodes. Furthermore, as shown in the cross-sectional images in FIGS. 12, 13, and 15, for any width of the slits, it can be perceived that the orientation of the liquid crystal molecules along the outer edge of the comb shaped portions of the pixel electrode is uneven in an area near the center thereof in the cell thickness direction. The area in concern is surrounded by a dotted line This is especially true in case the width of the slit is widest, which is 24 μm. As shown in a plan view image in FIG. 15, the liquid crystal molecules are evenly oriented between the comb shaped portions of the pixel electrode in a vicinity of a center of a light transmissive region (b), but it can be clearly perceived that disclination is occurring along an outer edge of the comb shaped portion because the orientation of the liquid crystal molecules is uneven in the vicinity region (c) of the comb shaped portions of the pixel electrode. As for the portion in region (a), the slit is wide and the electric field is weak, and therefore the liquid crystal molecules are not affected by the horizontal electric field, and thus do not rotate horizontally, resulting in low transmittance.

If the occurrence of disclination is studied in further detail, in the plan view image of FIG. 15, a mixture of both the liquid crystal molecules 32 that are oriented so as to be inclined 45° to a polarizing axis and liquid crystal molecules 33 that are oriented so as to be substantially parallel to the comb shaped portion of the pixel electrode, can be found. Furthermore, as shown in the cross-sectional view images in FIGS. 12, 13, and 15, it can be perceived that the orientation of the liquid crystal molecules along the outer edge of the comb shaped portions of the pixel electrode is flipped in an area near the center thereof in the cell thickness direction. The area in concern is surrounded by a dotted line.

As for the liquid crystal display device of the present invention, a horizontal electric field is formed during white display, making the electric field in the vicinity of the comb shaped portions of the pixel electrodes stronger, and as the distance from the comb shaped portion of the pixel electrode becomes greater, the electric field weakens. As a result, the liquid crystal molecules in the vicinity of the comb shaped portions of the pixel electrode are strongly affected by the horizontal electric field and rotate horizontally, but the response speed of the liquid crystal molecules between the comb shaped portions of the pixel electrode is slower than the liquid crystal molecules in the vicinity of the comb shaped portions of the pixel electrode, and thus it can be thought that disclination occurs as the liquid crystal molecules collide. On the other hand, the liquid crystal molecules near the second substrate surface have a weak horizontal electric field, but are strongly affected by the restraining force of the alignment film, and thus have a larger pre-tilt angle than the liquid crystal molecules near the center in the cell thickness direction. As liquid crystal molecules are more easily rotated when the pre-tilt angle thereof is closer to being perpendicular, it can be thought that the liquid crystal molecules near the second substrate surface and liquid crystal molecules near a center of the cell thickness direction will collide with each other and cause disclination.

As a result, disclination can be thought to occur along an outer edge of the comb shaped portions of the pixel electrode in an area surrounded by dotted lines in FIGS. 12, 13, and 15, which is an area in the vicinity of the center in the cell thickness direction, and which is in a location near the second substrate.

Evaluation Test 2

Figure 16:
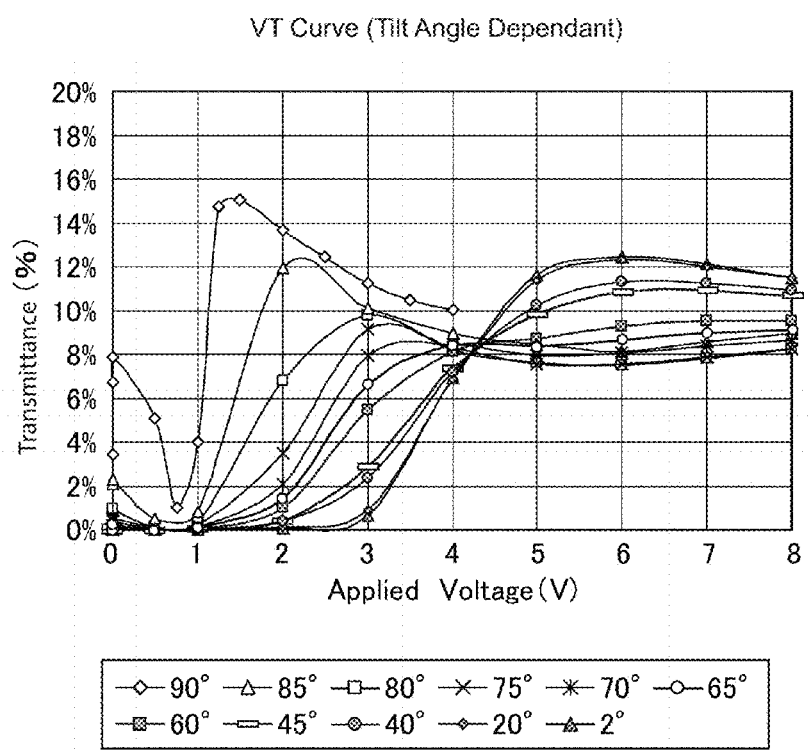
FIG. 16 is a graph showing a VT curve in an Evaluation Test 2.
Figure 17:
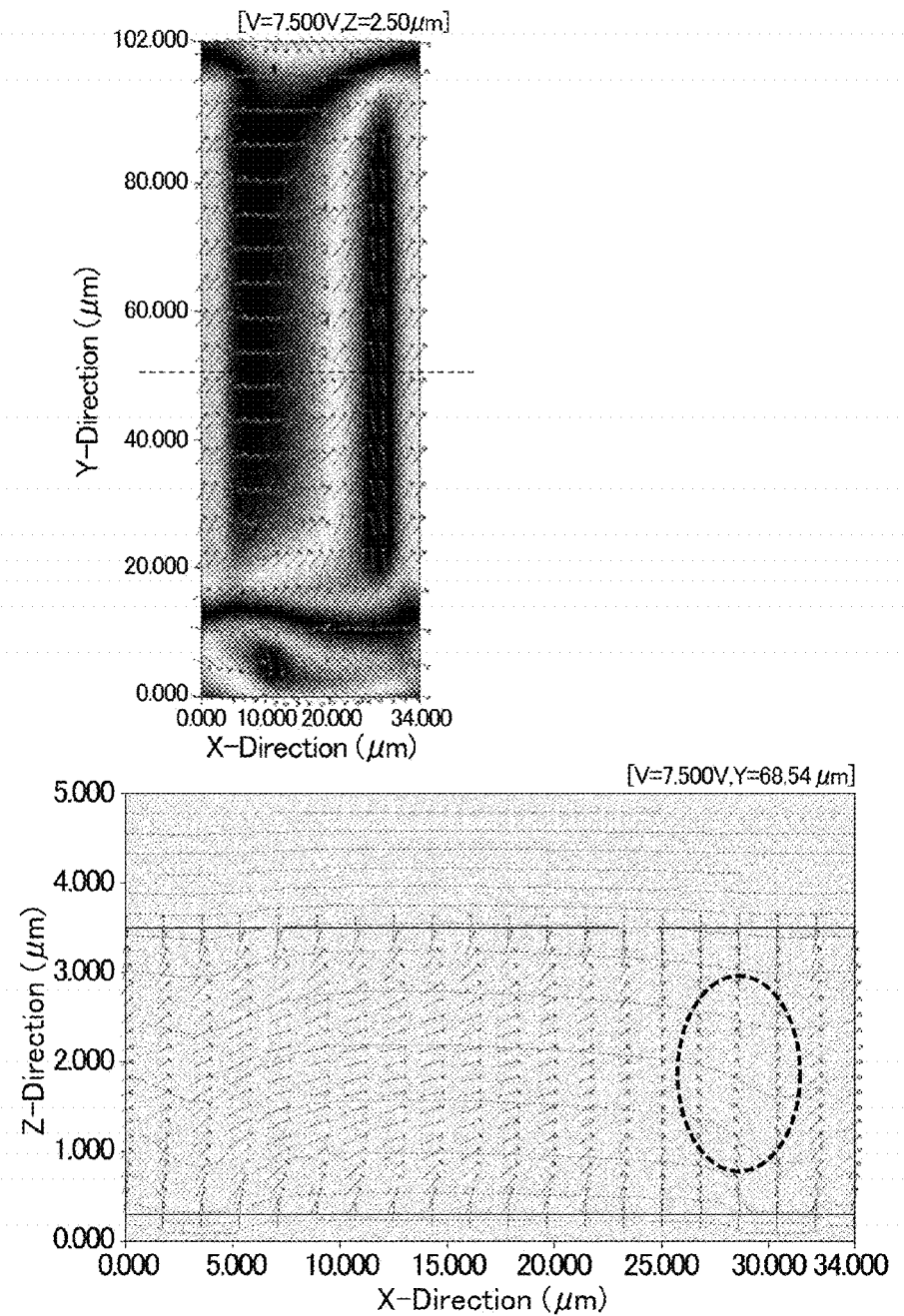
FIG. 17 is a plan view image and a cross-sectional image of the liquid crystal cell having a pre-tilt angle of 89.9° in the Evaluation Test 2.
Figure 18:
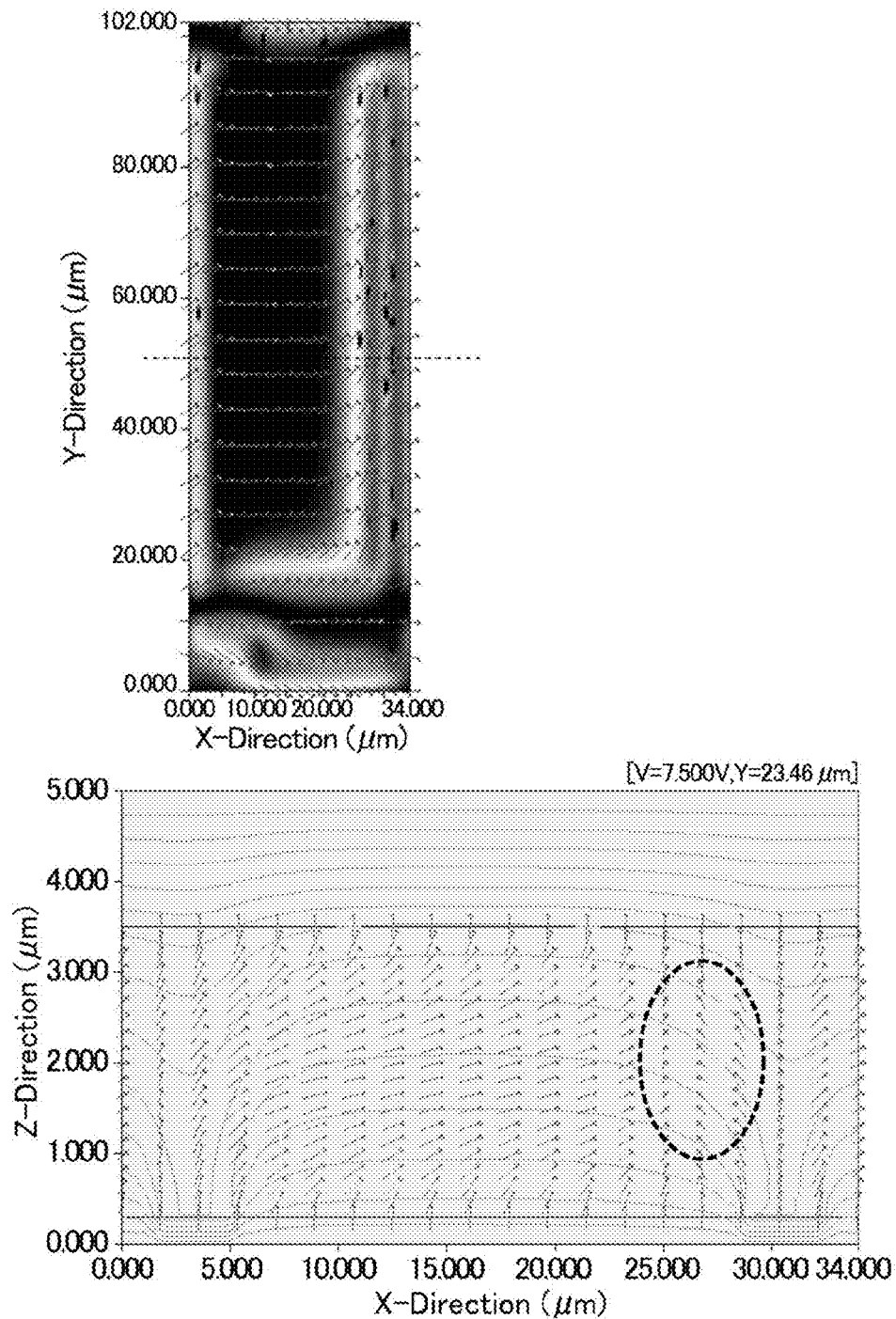
FIG. 18 is a plan view image and a cross-sectional image of the liquid crystal cell having a pre-tilt angle of 85° in the Evaluation Test 2.
Figure 19:
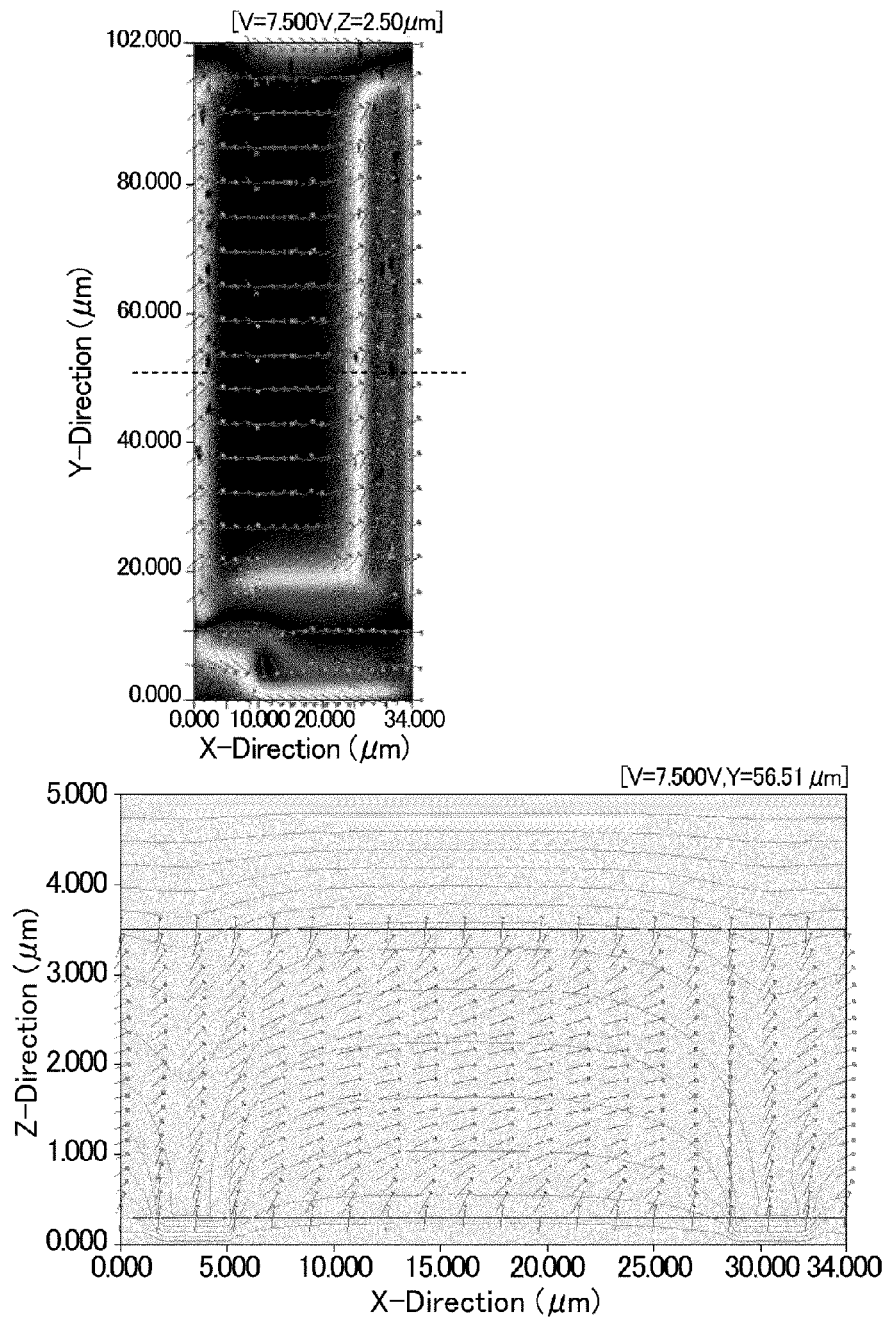
FIG. 19 is a plan view image and a cross-sectional image of the liquid crystal cell having a pre-tilt angle of 80° in the Evaluation Test 2.
Figure 20:
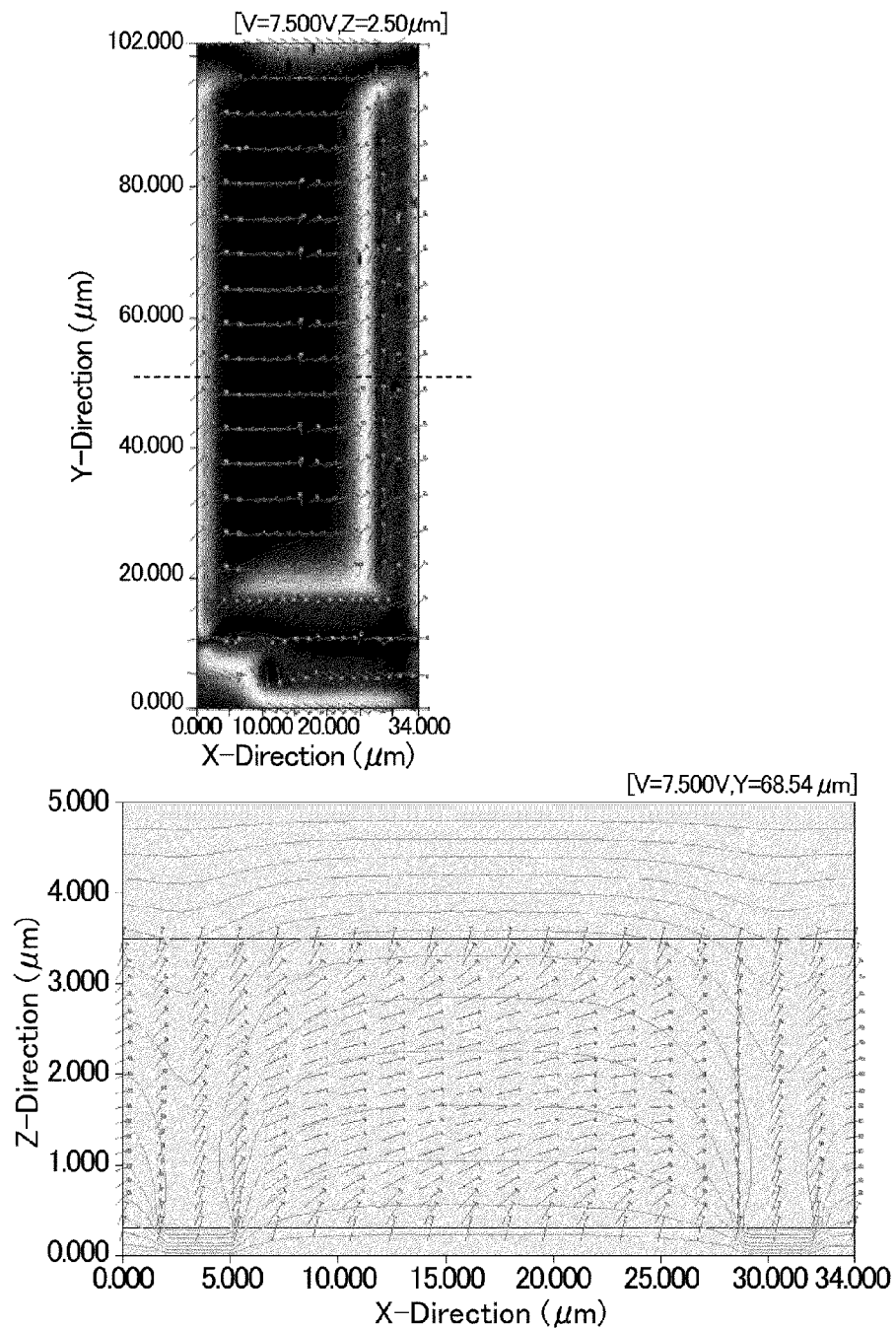
FIG. 20 is a plan view image and a cross-sectional image of the liquid crystal cell having a pre-tilt angle of 75° in the Evaluation Test 2.
Figure 21:
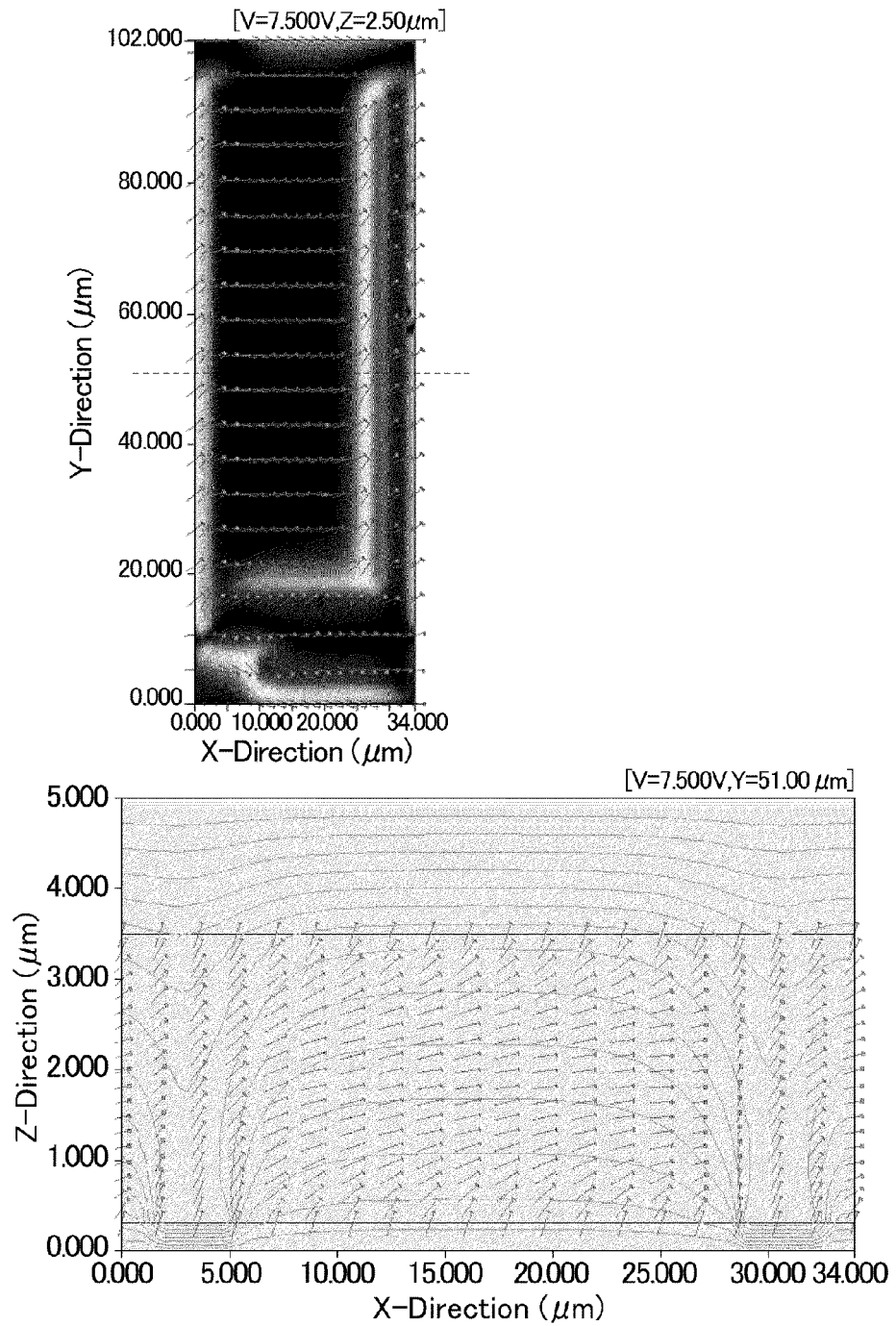
FIG. 21 is a plan view image and a cross-sectional image of the liquid crystal cell having a pre-tilt angle of 70° in the Evaluation Test 2.
Figure 22:
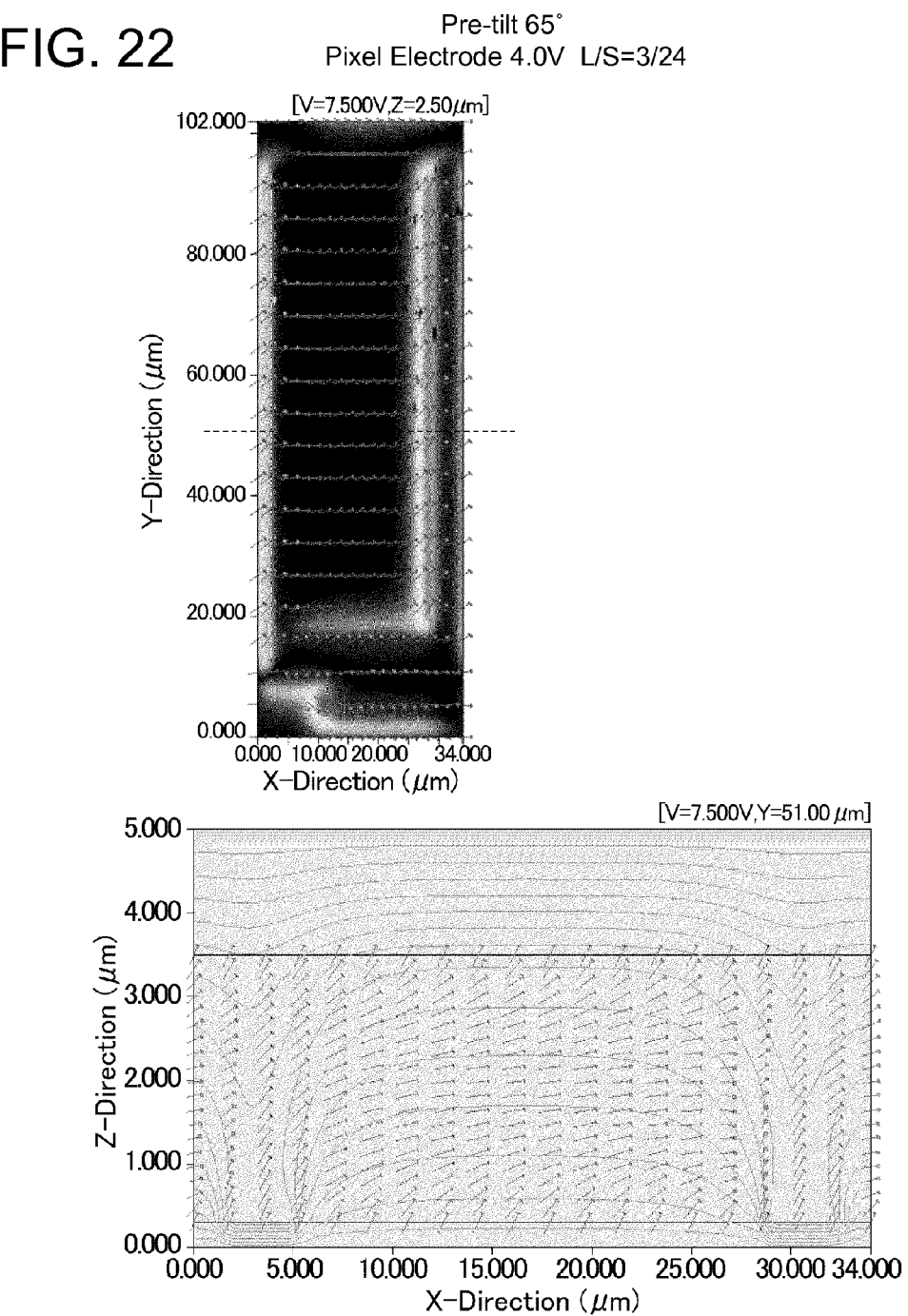
FIG. 22 is a plan view image and a cross-sectional image of the liquid crystal cell having a pre-tilt angle of 65° in the Evaluation Test 2.
Figure 23:
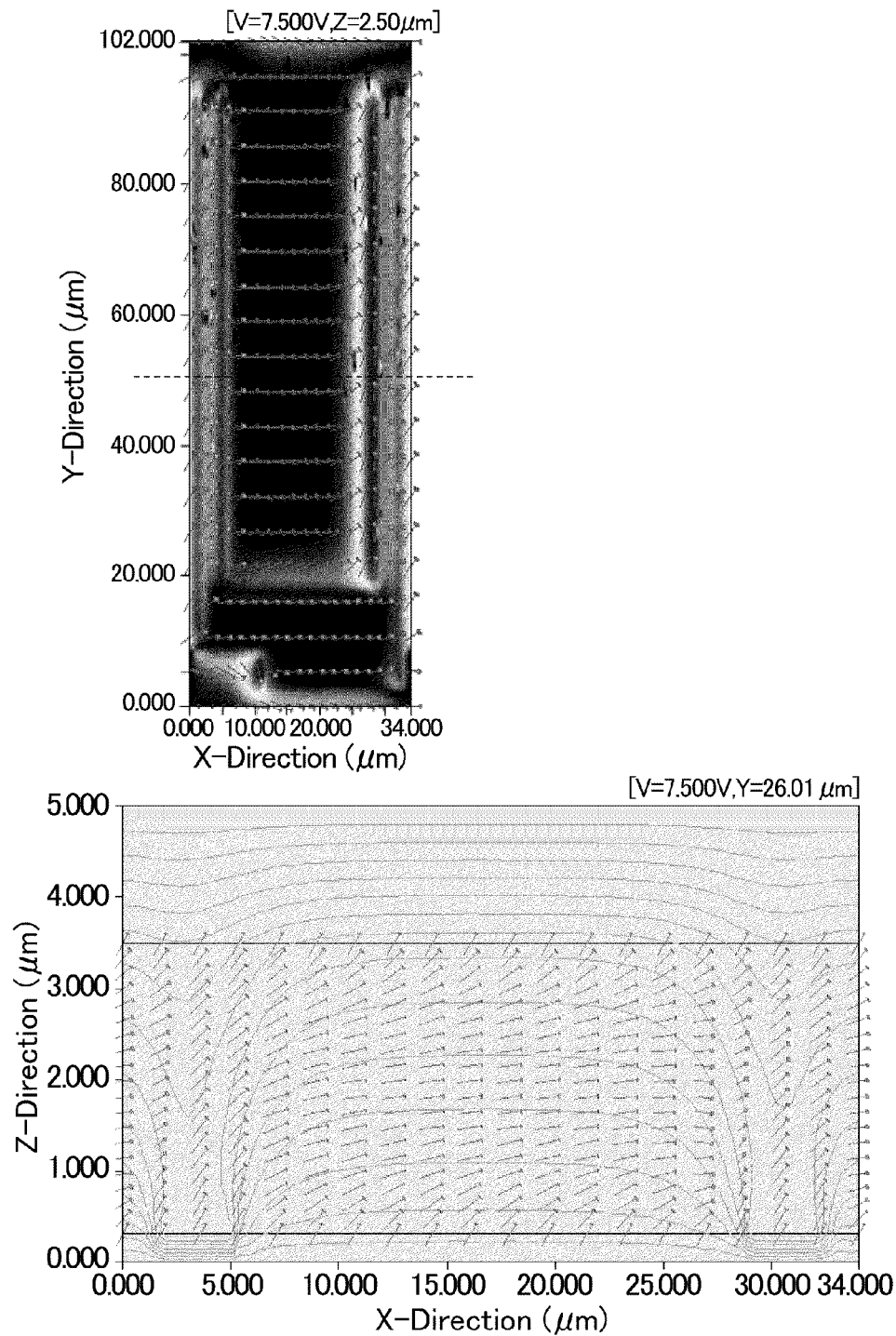
FIG. 23 is a plan view image and a cross-sectional image of the liquid crystal cell having a pre-tilt angle of 60° in the Evaluation Test 2.
Figure 24:
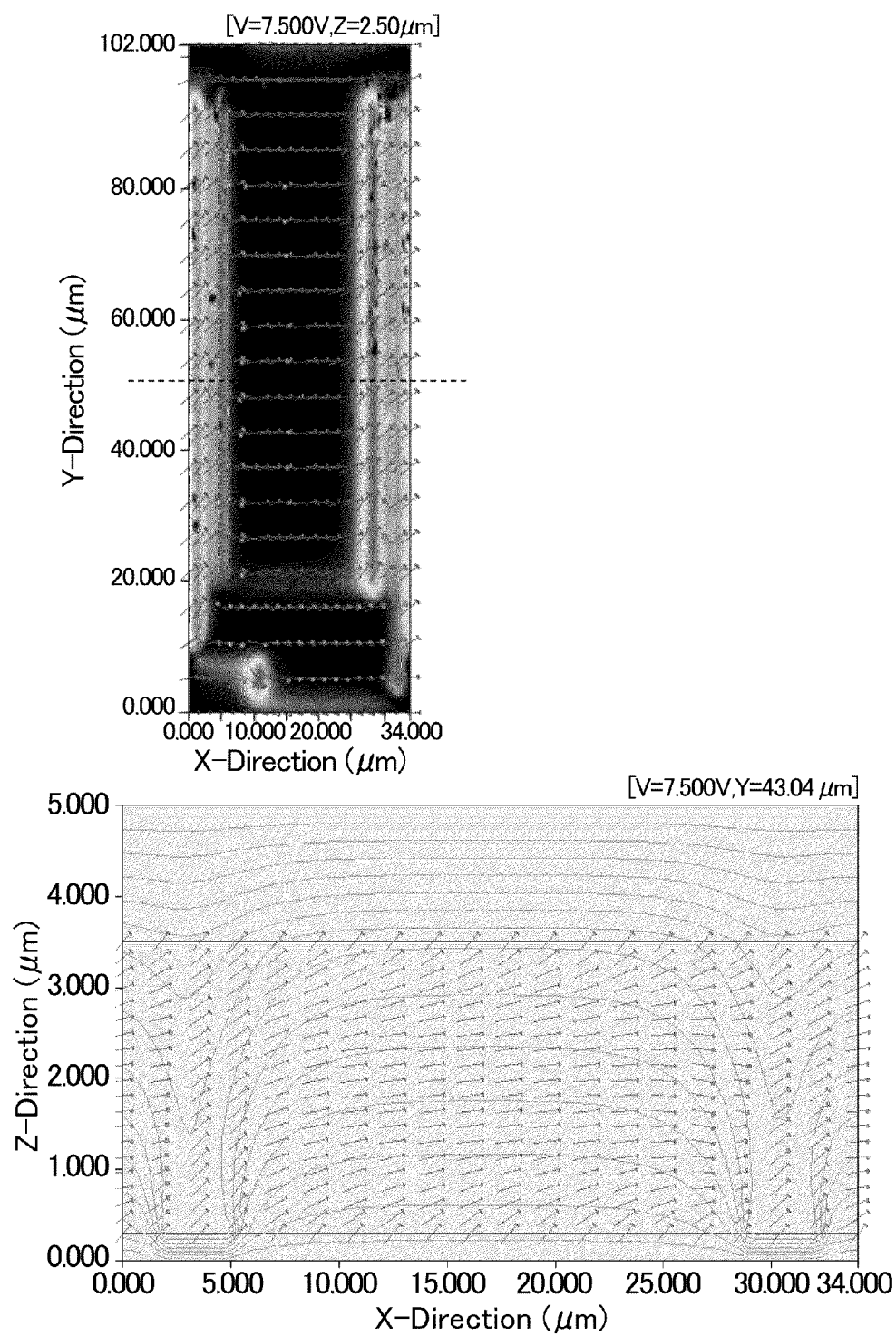
FIG. 24 is a plan view image and a cross-sectional image of the liquid crystal cell having a pre-tilt angle of 45° in the Evaluation Test 2.
Figure 25:
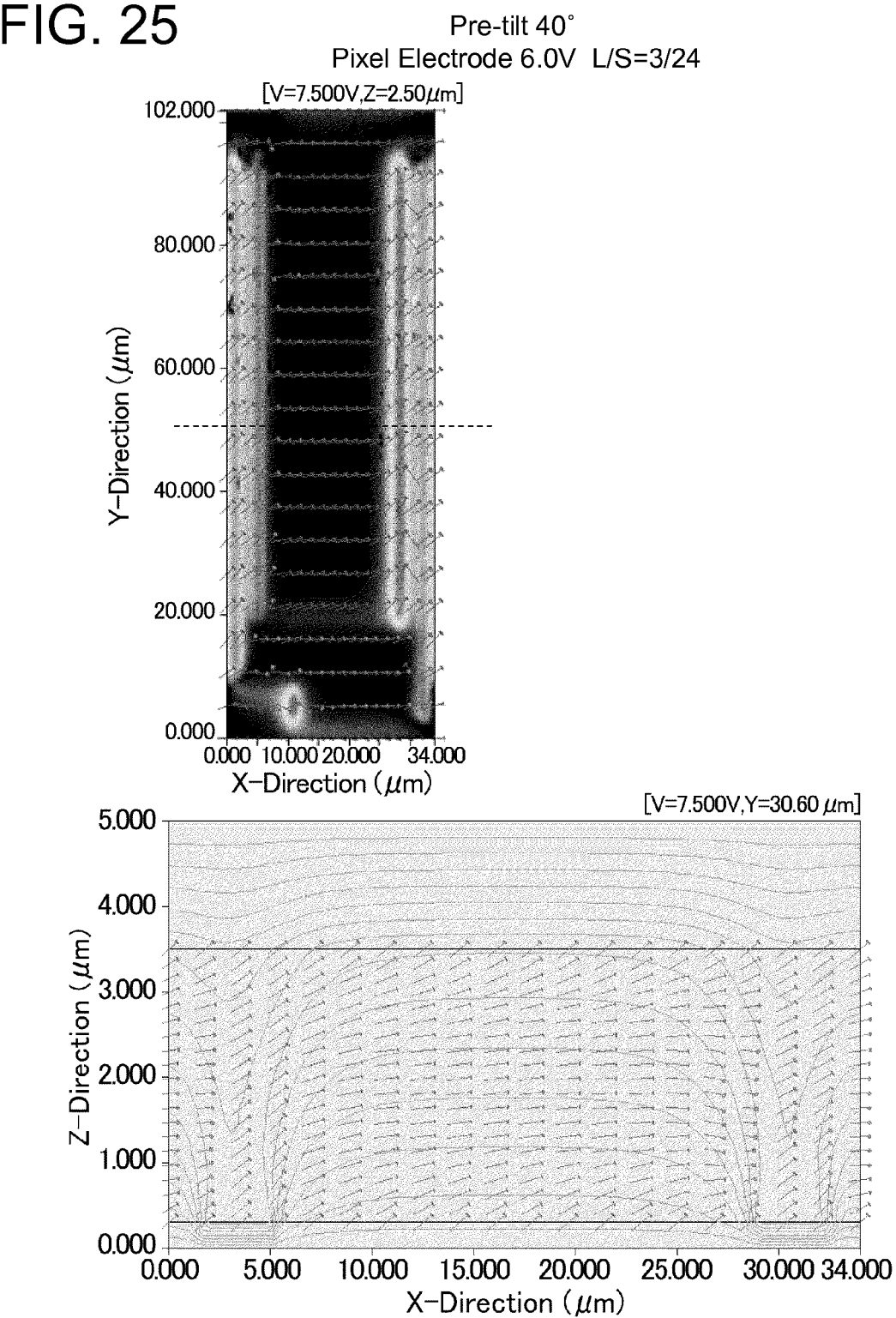
FIG. 25 is a plan view image and a cross-sectional image of the liquid crystal cell having a pre-tilt angle of 40° in the Evaluation Test 2.
Figure 26:
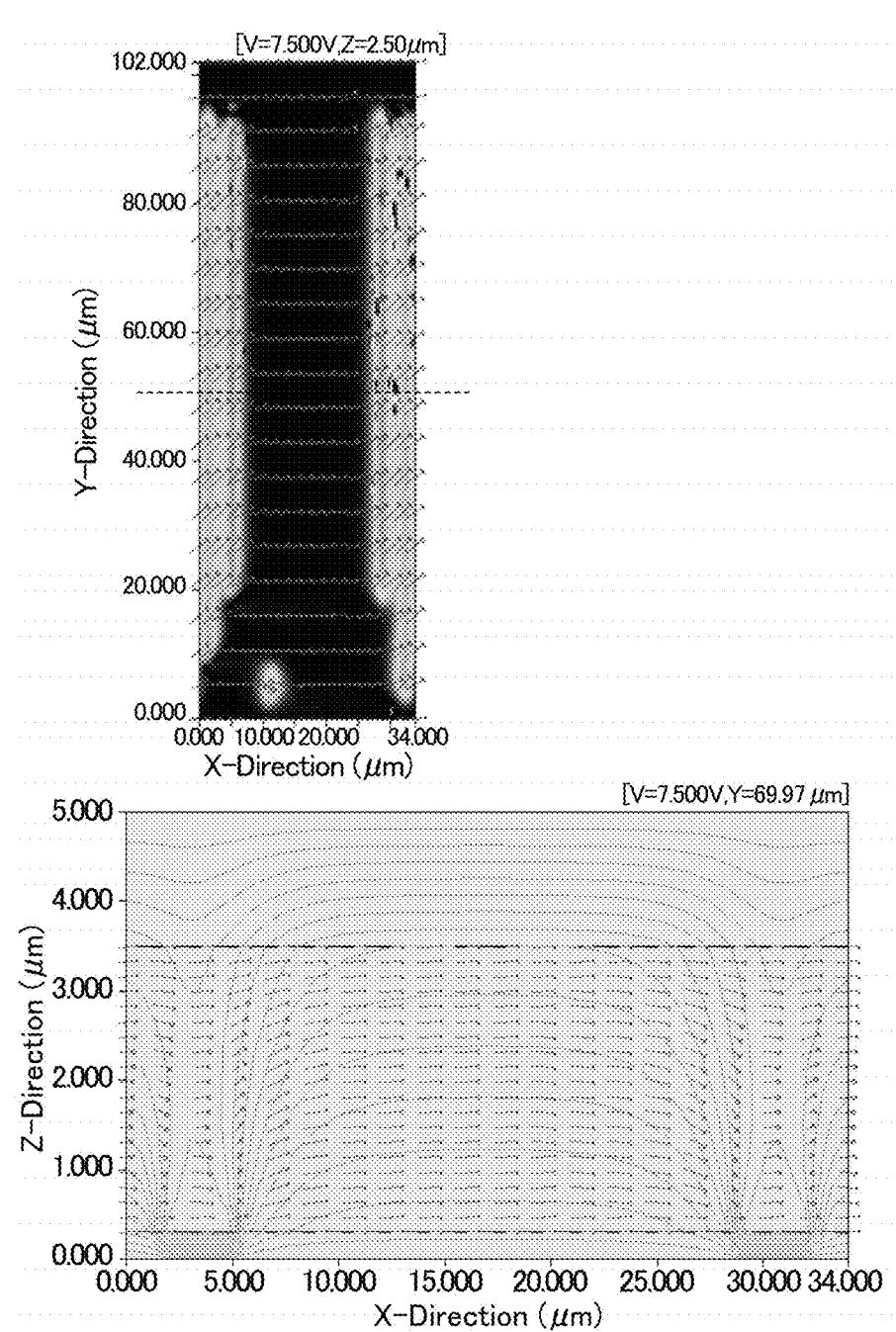
FIG. 26 is a plan view image and a cross-sectional image of the liquid crystal cell having a pre-tilt angle of 2° in the Evaluation Test 2.

In Evaluation Test 2, studies took place under the condition L/S=3/24 such that the state of the liquid crystal molecules in the vicinity of the pixel electrodes can be easily perceived. First, a study of the relationship between the pre-tilt angle and the VT curve was conducted. FIG. 16 is a graph showing the VT curve when the pre-tilt angle with respect to the first substrate and the second substrate is 90°, 85°, 80°, 75°, 70°, 65°, 60°, 45°, 40°, 20°, and 2°.

As shown in FIG. 16, if the pre-tilt angle is large, then a steeper graph is obtained, and if the pre-tilt angle becomes smaller, a smoother graph is obtained. If the pre-tilt angle is less than or equal to 70°, as voltage rises, transmittance rises and an excellent VT curve that is maintained at a constant value can be obtained. Furthermore, especially if a pre-tilt angle is less than or equal to 40°, it was perceived that excellent gradation display can be obtained as the fluctuation of the VT curve is smooth.

Next, a study on the relationship between the orientation state of the liquid crystal molecules during white display and the pre-tilt angle was conducted. The voltage in which the highest transmittance was obtained in FIG. 16 was applied between the pixel electrodes and the first common electrode. FIGS. 17 to 26 are plan view images and cross-sectional view images of each liquid crystal cell in case the pre-tilt angle to the first substrate and the second substrate is 89.9°, 85°, 80°, 75°, 70°, 65°, 60°, 45°, 40°, and 2°.

As shown in plan view images in FIGS. 17 to 26, it can be seen that disclination is suppressed as the region in which the orientation of the liquid crystal molecules is uneven along the outer edge of the comb shaped portion of the pixel electrode becomes narrower as the pre-tilt angle becomes lower. If the pre-tilt angle is more than 80°, the width of the lighting region becomes wider, but disclination occurs. Furthermore, as shown in the cross-sectional images in FIGS. 17 and 18, if the pre-tilt angle is greater than 80°, flipping of the liquid crystal molecules in the portion surrounded by dotted lines can be clearly seen. However, as shown in the cross-sectional images in FIGS. 19 to 26, as the pre-tilt angle becomes smaller, it can be seen that the orientation of the liquid crystal molecules is uniform along the outer edge of the comb shaped portion of the pixel electrode.

In the present invention, as a vertical alignment film is used, if pre-tilt properties are not added, the liquid crystal molecules become perpendicular to the substrate surface. As studied in Evaluation Test 1, the more the liquid crystal molecules are perpendicular to the substrate surface the easier to rotate, and therefore it can be thought that much disclination will occur along the outer edge of the comb portion of the pixel electrode in a vicinity of the center in a cell thickness direction.

As from the results in the Evaluation Test 2, it was found that as the pre-tilt angle of the liquid crystal molecules to the first substrate and the second substrate becomes smaller, the flipping of the liquid crystal molecules in the vicinity of the comb shaped portions of the pixel electrode is suppressed, and thus the occurrence of disclination can be suppressed. As can be seen in FIGS. 21 to 26, especially when the pre-tilt angle is 70° or less, hardly any flipping of the liquid crystal molecules in the vicinity of the comb shaped portions of the pixel shaped portions of the pixel electrode was perceived, and excellent uniform orientation was obtained.

Furthermore, the effect in which disclination can be suppressed by making the pre-tilt angle small can be thought to be similarly obtainable even if the width of the slit is narrower. Thus, by making the pre-tilt angle of the liquid crystal molecules to the first substrate and the second substrate smaller, as seen in a plan view image in FIGS. 12 to 15, the occurrence of disclination along an outer edge of a comb shaped portion of a pixel electrode can be suppressed, and furthermore, if a width of a slit is narrow, the entire area between the comb shaped portion of the pixel electrode was lit, and a high transmittance can be realized.

Evaluation Test 3

Figure 27:
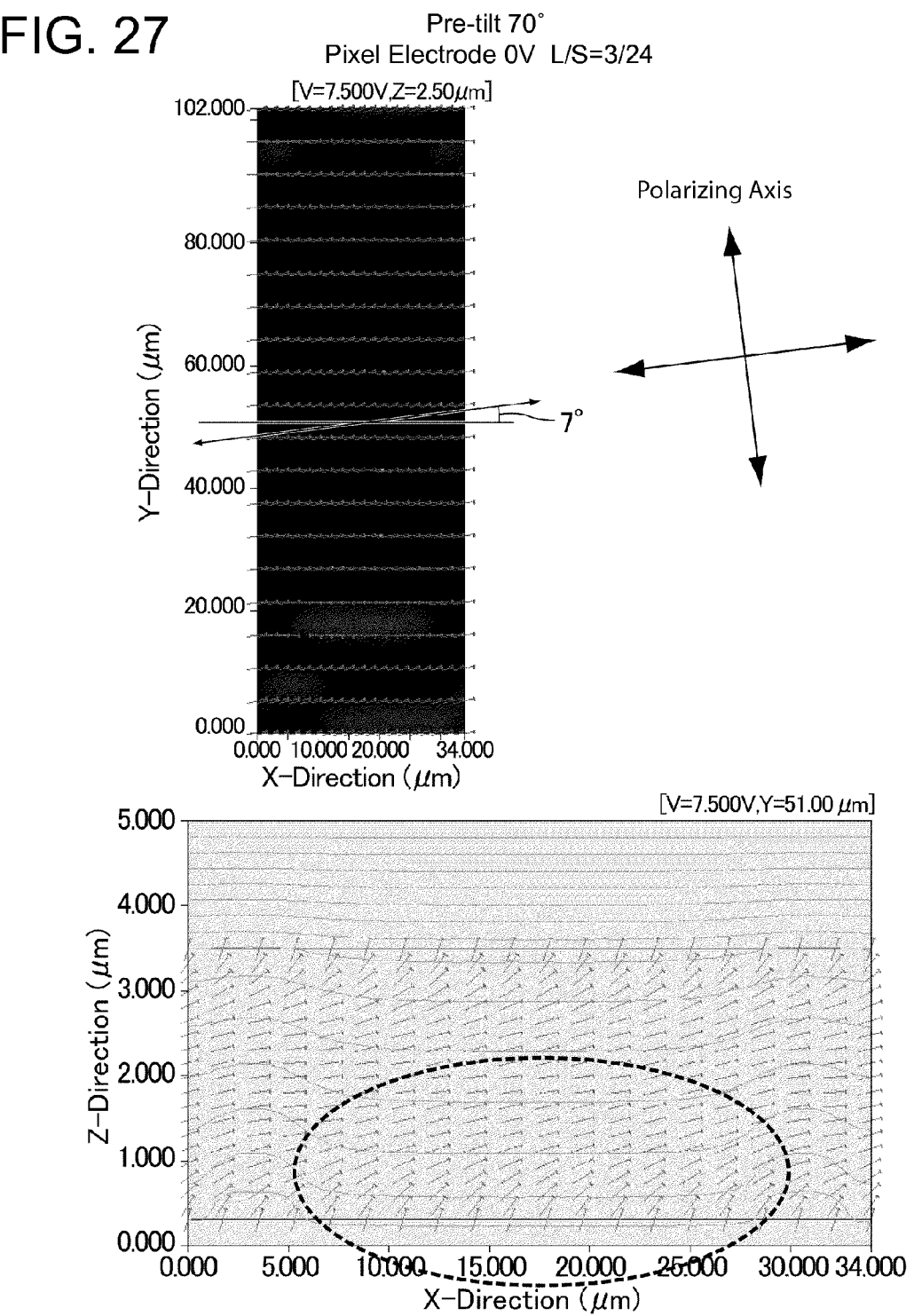
FIG. 27 is a plan view image and a cross-sectional image of the liquid crystal cell when the difference in potential between the first common electrode and the pixel electrodes is 0V.
Figure 28:
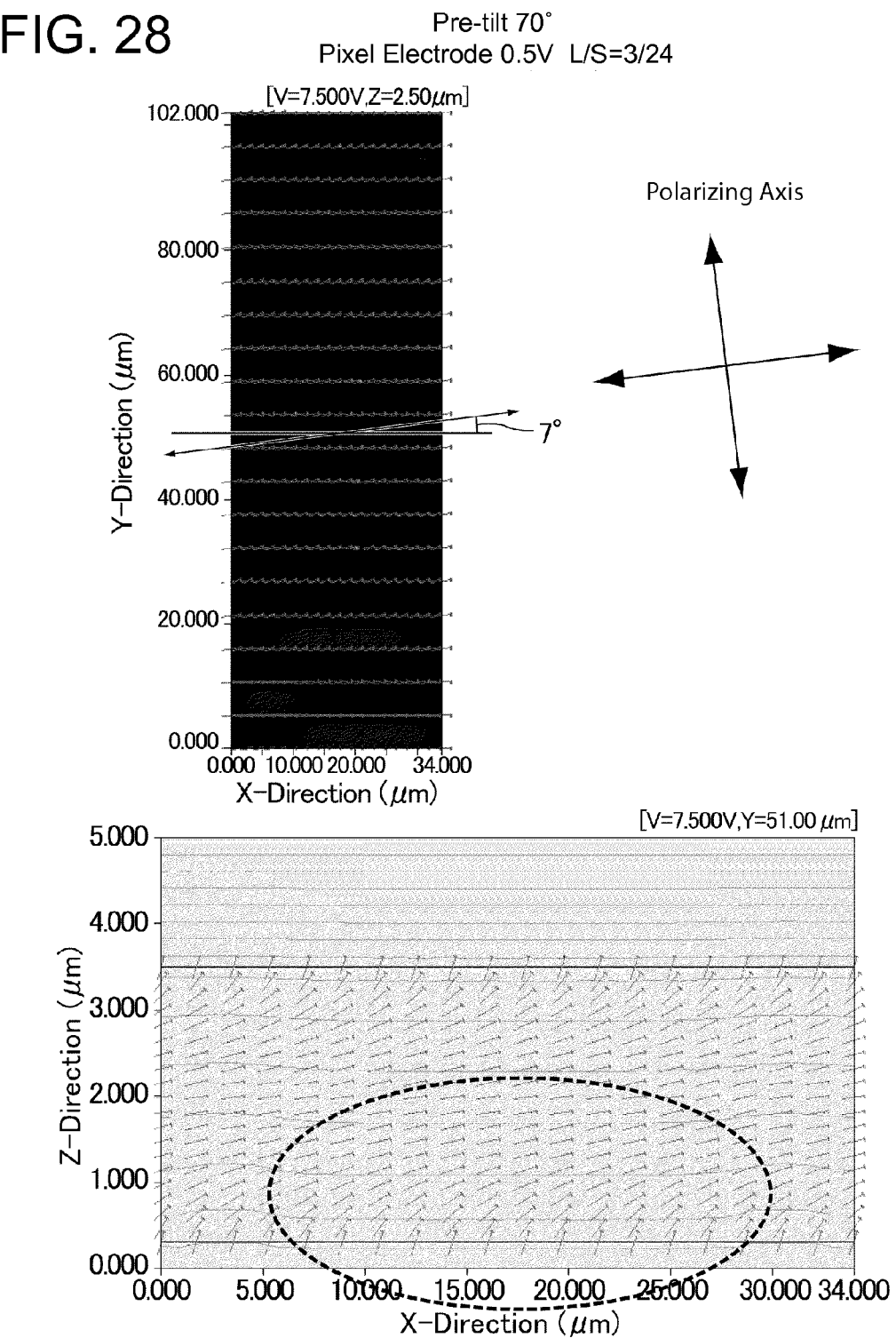
FIG. 28 is a plan view image and a cross-sectional image of the liquid crystal cell when the difference in potential between the first common electrode and the pixel electrodes is 0.5V in an Evaluation Test 3.
Figure 29:
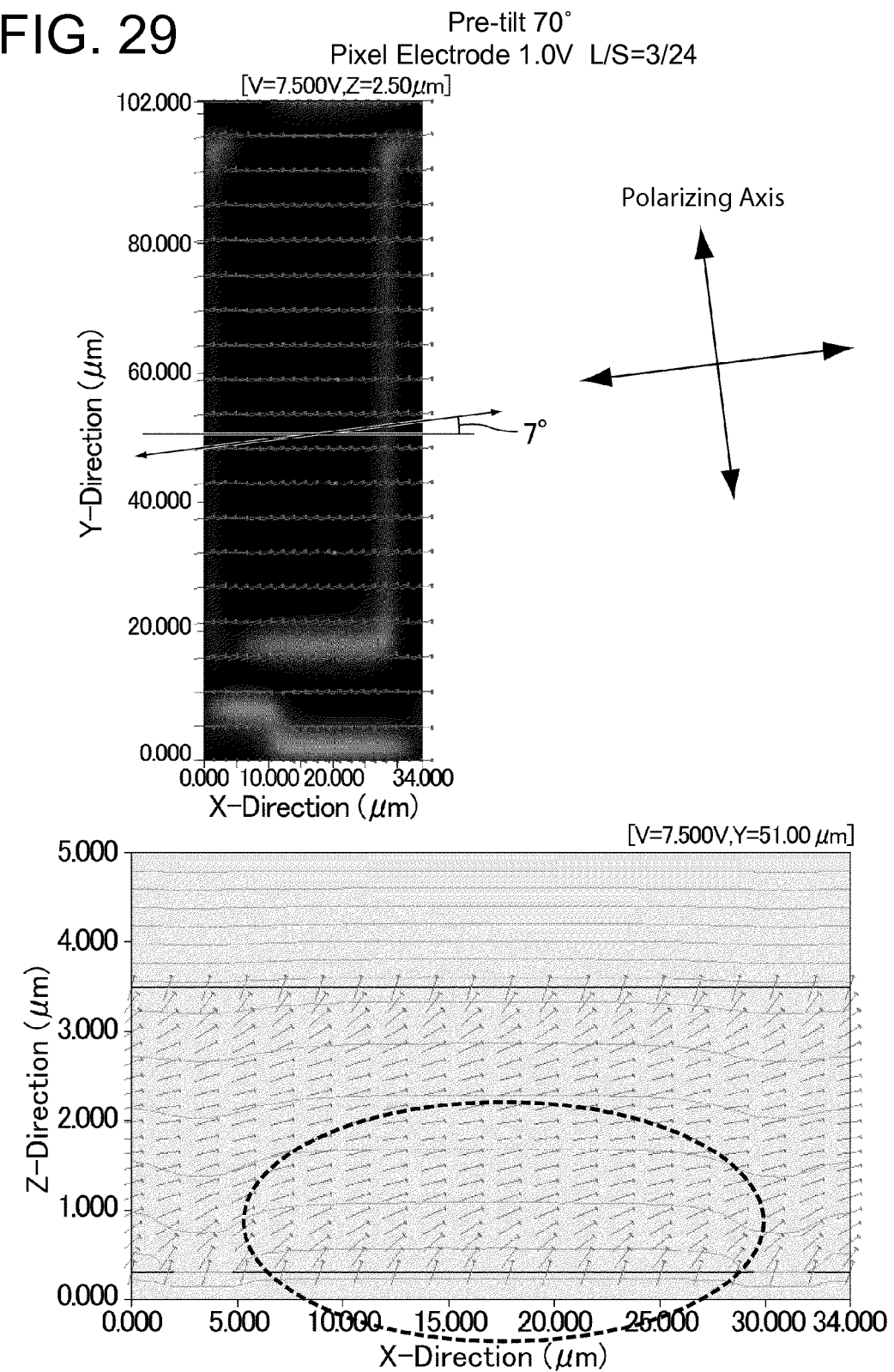
FIG. 29 is a plan view image and a cross-sectional image of the liquid crystal cell when the difference in potential between the first common electrode and the pixel electrodes is 1.0V in the Evaluation Test 3.

In Evaluation Test 3, a study was conducted on the potential supplied to the pixel electrode during black display. As from the VT curve in FIG. 16 of Evaluation Test 2, for each pre-tilt angle, it can be seen that the transmittance is lowest when a potential of 0.1V to 1.0V is applied to the pixel electrode. FIGS. 27 to 29 are each a plan view image and a cross-sectional view image of a liquid crystal cell when a difference in potential between the first common electrode and the pixel electrode during black display is 0V, 0.5V, or 1.0V. As shown in FIG. 27, it can be seen that if a difference in potential between the first common electrode and the pixel electrode is 0V, then the equipotential surface between the electrodes become lower than being horizontal to the substrate surface, and whitening problems occur. This can be because the equipotential surface between the comb shaped portions of the pixel electrode is affected by the first common electrode. As shown in FIG. 28, it can be seen that if a difference in potential between the first common electrode and the pixel electrode is 0.5V, then the equipotential surface between the electrodes becomes horizontal to the substrate surface, and whitening problems occur. As shown in FIG. 29, it can be seen that if a difference in potential between the first common electrode and the pixel electrode is 1.0V, then the equipotential surface between the electrodes becomes higher than being horizontal to the substrate surface, and have slightly low gradation.

From the result of the Evaluation Test 3, it was found that by making the difference in potential between the first common electrode and the pixel electrode be 0.5V to 0.8V, such that the equipotential surface is closer to being horizontal to the substrate surface, excellent black display can be obtained, and thus excellent display with a high contrast ratio can be realized.

DESCRIPTION OF REFERENCE CHARACTERS 1 data signal line
2 scan wiring line
3 semiconductor layer
4 drain lead-out wiring
5 contact hole
6 thin film transistor (TFT)
7 dark line
10 first substrate
11, 21 support substrate
12 first common electrode
13 insulating film
14 pixel electrode
14a comb shaped portion of a pixel electrode
14b gap (slit) between adjacent comb shaped portions
15, 25 alignment film
20 second substrate
22 second common electrode
30 liquid crystal layer
31 liquid crystal molecule
32 liquid crystal molecules oriented so as to be inclined by 45° to a polarizing axis
33 liquid crystal molecules oriented so as to be substantially parallel to the comb shaped portion of the pixel electrode

What is claimed is:

1. A liquid crystal display device, comprising:
a first substrate and a second substrate facing each other; and
a liquid crystal layer sandwiched between the first substrate and the second substrate,
wherein the liquid crystal layer includes liquid crystal molecules having a negative dielectric anisotropy,
wherein the first substrate has a first common electrode having a plate shape, an insulating film, and pixel electrodes provided on a different layer from the first common electrode, the insulating film being interposed between the pixel electrodes and the first common electrode,
wherein the pixel electrodes have a comb-shaped structure,
wherein the second substrate has a second common electrode having a plate shape, and a film formed by having an alignment treatment applied to a vertical alignment film to adjust an average initial inclination angle of the liquid crystal molecules at the vertical alignment film, and
wherein the liquid crystal display device is configured such that when gradation is highest, a difference in potential between the first common electrode and the second common electrode is greater than a difference in potential between the first common electrode and the pixel electrodes.

2. The liquid crystal display device according to claim 1, wherein the first substrate is provided with a film formed by having an alignment treatment applied to a vertical alignment film to adjust an average initial inclination angle of the liquid crystal molecules at the vertical alignment film.

3. The liquid crystal display device according to claim 2, wherein the difference in potential between the first common electrode and the pixel electrodes is set to be 0.1 to 1.0V when the gradation is lowest.

4. The liquid crystal display device according to claim 1, wherein the average initial inclination angle of the liquid crystal molecules at the second substrate is less than or equal to 70°.

5. The liquid crystal display device according to claim 4, wherein the average initial inclination angle of the liquid crystal molecules at the first substrate is less than or equal to 70°.

6. The liquid crystal display device according to claim 5, wherein the difference in potential between the first common electrode and the pixel electrodes is set to be 0.1 to 1.0V when the gradation is lowest.

7. The liquid crystal display device according to claim 4, wherein the difference in potential between the first common electrode and the pixel electrodes is set to be 0.1 to 1.0V when the gradation is lowest.

8. The liquid crystal display device according to claim 1, wherein the average initial inclination angle of the liquid crystal molecules at the second substrate is less than or equal to 40°.

9. The liquid crystal display device according to claim 8, wherein the average initial inclination angle of the liquid crystal molecules at the first substrate is less than or equal to 40°.

10. The liquid crystal display device according to claim 9, wherein the difference in potential between the first common electrode and the pixel electrodes is set to be 0.1 to 1.0V when the gradation is lowest.

11. The liquid crystal display device according to claim 8, wherein the difference in potential between the first common electrode and the pixel electrodes is set to be 0.1 to 1.0V when the gradation is lowest.

12. The liquid crystal display device according to claim 1, wherein the difference in potential between the first common electrode and the pixel electrodes is set to be 0.1 to 1.0V when the gradation is lowest.

\* \* \* \* \*